United States Patent
Kamoshida

(10) Patent No.: US 7,502,052 B2
(45) Date of Patent: Mar. 10, 2009

(54) IMAGE DEFORMATION ESTIMATING METHOD AND IMAGE DEFORMATION ESTIMATING APPARATUS

(75) Inventor: Yukio Kamoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 11/083,488

(22) Filed: Mar. 18, 2005

(65) Prior Publication Data

US 2005/0206739 A1    Sep. 22, 2005

(30) Foreign Application Priority Data

Mar. 19, 2004    (JP)    ............... 2004-081151

(51) Int. Cl.
*H04N 5/228*    (2006.01)
(52) U.S. Cl. .............. 348/208.99; 348/208.1; 348/208.4; 348/208.6
(58) Field of Classification Search ............ 348/208.99, 348/208.1, 208.4, 208.6
See application file for complete search history.

(56) References Cited

U.S. PATENT DOCUMENTS

| | | | |
|---|---|---|---|
| 5,682,205 A * | 10/1997 | Sezan et al. ................. | 348/452 |
| 6,205,178 B1 * | 3/2001 | Suzuki et al. ........... | 375/240.15 |
| 6,535,244 B1 * | 3/2003 | Lee et al. ................. | 348/208.1 |
| 6,628,711 B1 * | 9/2003 | Mathew et al. ......... | 375/240.12 |
| 6,924,836 B2 * | 8/2005 | Ohki ....................... | 348/208.6 |
| 7,042,512 B2 * | 5/2006 | Yang et al. ................ | 348/452 |
| 7,251,276 B2 * | 7/2007 | Lee et al. ................ | 375/240.03 |
| 2002/0094026 A1 * | 7/2002 | Edelson ................. | 375/240.01 |

(Continued)

FOREIGN PATENT DOCUMENTS

EP    1 117 251 A1    7/2001

(Continued)

OTHER PUBLICATIONS

Dobashi et al, "Camera Working Parameter Extraction For Constructing Video Considering Camera Shake", Proceedings 2001 International Conference On Image Processing, ICIP 2001, Thessaloniki, Greece, Oct. 7-10, 2001, International Conference On Image Processing, New York, NY: IEEE, US, vol. 1 Of 3, Conf. 8, Oct. 7, 2001, pp. 382-385, XP010563363, ISBN: 0-7803-6725-1.

*Primary Examiner*—James M Hannett
(74) *Attorney, Agent, or Firm*—Morgan & Finnegan LLP

(57) ABSTRACT

Provided is an image deformation estimating method capable of obtaining information expressing image deformation between frame images caused by a camera shake with almost no influence of photographing conditions. The image deformation estimating method includes: a first step of providing plural local area in plural frame images, which form a moving image, and obtaining plural pieces of first information indicating movements among the plural frame images in the plural local areas, respectively; a second step of obtaining plural pieces of second information, which express image deformation of each of the plural local areas, using the plural pieces of first information; a third step of preparing plural selected rules, selecting the plural pieces of second information for each of the selected rules, and obtaining second representative information, which represents the selected plural pieces of second information, for each of the selected rules; and a fourth step of using the plural pieces of second representative information, which are obtained for the plural selected rules, to obtain third information expressing deformation of an entire image.

13 Claims, 17 Drawing Sheets

U.S. PATENT DOCUMENTS

2003/0133019 A1 7/2003 Higurashi et al.

FOREIGN PATENT DOCUMENTS

| | | | |
|---|---|---|---|
| JP | 2506500 | B2 | 4/1996 |
| JP | 2586686 | B2 | 12/1996 |
| JP | 9-212649 | A | 8/1997 |
| JP | 10-233958 | A | 9/1998 |

* cited by examiner

IMAGE DEFORMATION ESTIMATING METHOD AND IMAGE DEFORMATION ESTIMATING APPARATUS

BACKGROUND OF THE INVENTION

1. Field of the Invention

The present invention relates to a method and apparatus for obtaining information that expresses image deformation between frame images of a moving image caused by shake of a camera or the like in photographing moving images.

2. Related Background Art

Conventionally, various methods have been proposed concerning a technique for correcting an image blur due to shake of a camera such as a hand shake in an image pickup apparatus such as a video camera. In addition, there are various methods concerning an image movement detection technique that constitutes an image blur correction technique. As one of the techniques, there is a technique for detecting plural movement vectors between frame images forming a moving image and calculating a movement vector representing a whole screen from those movement vectors to thereby detect movement of an image. However, image movement detecting methods and apparatuses, which are generally used for correction of an image blur, detect only movement of an image in horizontal and vertical directions. Thus, there is a problem in that, when a complicated image blur due to factors including rotation of an image pickup apparatus occurs, it is impossible to accurately detect the blur and the blur remains in a photographed image.

A movement vector caused by shake of a camera is a sum of movement components of magnification and reduction, rotation, and horizontal and vertical movements of an image. Thus, in order to accurately detect the horizontal movement and the vertical movement, influences of other shakes such as the magnification and reduction and the rotation have to be removed. Therefore, there is a demand for development of an image movement detection technique that is capable of detecting movement such as rotation in addition to movements in horizontal and vertical directions or detecting components of individual shakes accurately.

Deformation (geometrical deformation) of an image such as magnification and reduction, rotation, horizontal movement, and vertical movement is caused by camera shake between frame images. Affine transformation is one of models expressing the deformation. The image deformation caused by the camera shake can be expressed in a form of a matrix as indicated by the following expression.

$$\begin{bmatrix} x' \\ y' \end{bmatrix} = \begin{bmatrix} a & b \\ -b & a \end{bmatrix} \begin{bmatrix} x \\ y \end{bmatrix} + \begin{bmatrix} c \\ d \end{bmatrix} \quad (1)$$

A movement vector caused by the camera shake can be represented by the following expression.

$$\begin{bmatrix} v_x \\ v_y \end{bmatrix} = \begin{bmatrix} a' & b' \\ -b' & a' \end{bmatrix} \begin{bmatrix} x \\ y \end{bmatrix} + \begin{bmatrix} c' \\ d' \end{bmatrix} = \begin{bmatrix} a-1 & b \\ -b & a-1 \end{bmatrix} \begin{bmatrix} x \\ y \end{bmatrix} + \begin{bmatrix} c \\ d \end{bmatrix} \quad (2)$$

where, (x, y) represents arbitrary coordinates on the image and (x', y') represents coordinates to which the coordinates (x, y) are moved by the camera shake, $(v_x, v_y)$ represents an x component and a y component of a movement vector in the coordinates (x, y), a, b, c, and d are coordinate conversion parameters representing image deformation caused by the camera shake and a', b', c', and d' are movement parameters representing movement of the image caused by the camera shake.

When this affine transformation is used, it is possible to express the deformation and the movement vector of the image in arbitrary coordinates on the image, the deformation being caused by the cameral shake, with four parameters. In other words, it is possible to detect deformation or movement of the entire image by obtaining a, b, c, and d when attention is paid to the image deformation and by using a', b', c', and d' when attention is paid to the movement of the image.

Techniques for detecting movement of an image using the model described above are disclosed in Japanese Patent No. 2586686, Japanese Patent No. 2506500, Japanese Patent Application Laid-Open Nos. H9-212649, H10-233958, and the like.

In the method disclosed in Japanese Patent No. 2586686, the least square error estimation is applied to a movement vector, which is detected for each pixel or each small area, and a model of movement caused by a camera shake to detect a movement parameter expressing movement of an entire image. In addition, an error in vector detection is removed by using a filter to improve detection accuracy.

However, in the method disclosed in Japanese Patent No. 2586686, when there is movement different from a camera shake such as movement of a subject in a relatively large area, it is impossible to completely remove the movement with the filter. Thus, the accuracy is not enough from the viewpoint of detection of movement caused by the camera shake.

In the method disclosed in Japanese Patent No. 2506500, using conversion coefficients calculated by using plural movement vectors in a position of an image, an amount of movement in other positions of the image is predicted. Then, movement of the entire image is estimated using only movement vectors in an area where the number of areas, where a difference between the predicted value and an actually detected movement vector is equal to or lower than a threshold value, takes the maximum value.

In the method disclosed in Japanese Patent No. 2506500, an amount of calculation is large because it is repeatedly checked whether movements are identical on the basis of a difference between a movement vector calculated by using the conversion coefficients and the detected vector.

In Japanese Patent Application Laid-Open No. H9-212649, a movement parameter is calculated using plural movement vectors out of the movement vectors detected locally, and the calculation is repeated to calculate plural movement parameters. Then, a movement parameter value having a high frequency of appearance among the movement parameters is estimated as a movement parameter value representing an entire image.

In the method disclosed in Japanese Patent Application Laid-Open No. H9-212649, the movement parameter having a high frequency of appearance is set as a parameter for the entire image. However, it is likely that plural peaks exist or a wrong parameter is determined as a parameter value for the entire image when no clear peak is present.

In the method disclosed in Japanese Patent Application Laid-Open No. H10-233958, a distribution in a characteristic space of a movement vector is taken into account to calculate a parameter value for basic camera operation. In the method disclosed in Japanese Patent Application Laid-Open No. H10-233958, it is possible to calculate a parameter value for each camera shake. However, complicated processing such as clustering is required.

For image blur correction in a photographing apparatus such as a video camera, it is necessary to detect movement of an image due to a camera shake at high speed and accurately under various conditions. Therefore, it is necessary to develop an image movement detecting method and an image movement detecting apparatus that can solve the problems of the techniques described above and detect movement of an image due to a camera shake at high speed and accurately without being affected by movement of a subject and an error in movement detection and without being affected by photographing conditions. In addition, when correction of an image blur is taken into account, a coordinate conversion parameter expressing image deformation is more advantageous as a parameter to be detected than a movement parameter expressing a movement vector in the image.

Since the degree of movement due to magnification and reduction or rotation is proportional to a distance from an image center, minute movement due to magnification and reduction or rotation often appears only in a peripheral part of an image. However, in the methods described above, since movement vectors on the image used for calculating parameters expressing movement of the entire image are treated uniformly, it may be impossible to detect minute movement that appears only in the peripheral part of the image. Although an error in the movement detection is very small, when a parameter between frame images apart from each other is calculated by accumulating parameters among adjacent frame images, the error is accumulated to cause inconvenience.

Moreover, all the methods described above do not take into account a moving image having distortion photographed by a fish-eye lens or the like.

SUMMARY OF THE INVENTION

According to one aspect of the invention, in an image deformation estimating method and apparatus, plural local areas are first provided in plural frame images, which form a moving image, and plural pieces of first information indicating movements among the plural frame images in the plural local areas, respectively, are obtained. Then, plural pieces of second information, which express image deformation of each of the plural local areas, are obtained using the plural pieces of first information. Then, plural selected rules are prepared, the plural pieces of second information are selected for each of the selected rules, and second representative information, which represents the selected plural pieces of second information, is obtained for each of the selected rules. Then, the plural pieces of second representative information, which are obtained for the plural selected rules, are used to obtain third information expressing deformation of an entire image.

Here, if the frame images are fish-eye images, correction processing for fish-eye deformation components is applied to the first information, and the second information is obtained using the first information subjected to the correction processing.

According to another aspect of the present invention, in an image deformation estimating method and apparatus, plural local area are first provided in plural frame images, which form a moving image, and plural pieces of first information indicating movements among the plural frame images in the plural local areas, respectively, are obtained. Then, the respective pieces of first information are decomposed into plural pieces of second information expressing plural image deformation components, different from each other, of each of the plural local areas. Then, plural selected rules are prepared, plural pieces of the second information are selected for each of the image deformation components and for each of the selected rules, and second representative information, which represents the selected plural pieces of second information, is obtained for each of the image deformation components and for each of the selected rules. Then, the plural pieces of second representative information obtained for the plural image deformation components and the plural selected rules are used to obtain third information expressing deformation of an entire image.

Here, if the frame images are fish-eye images, correction processing for fish-eye deformation components is applied to the first information, and the respective pieces of first information subjected to the correction processing are decomposed into the plural pieces of second information. Alternatively, correction processing for fish-eye deformation components is applied to the second information, and the second representative information is obtained using the second information subjected to the correction processing.

DESCRIPTION OF THE PREFERRED EMBODIMENTS

Figure 1:
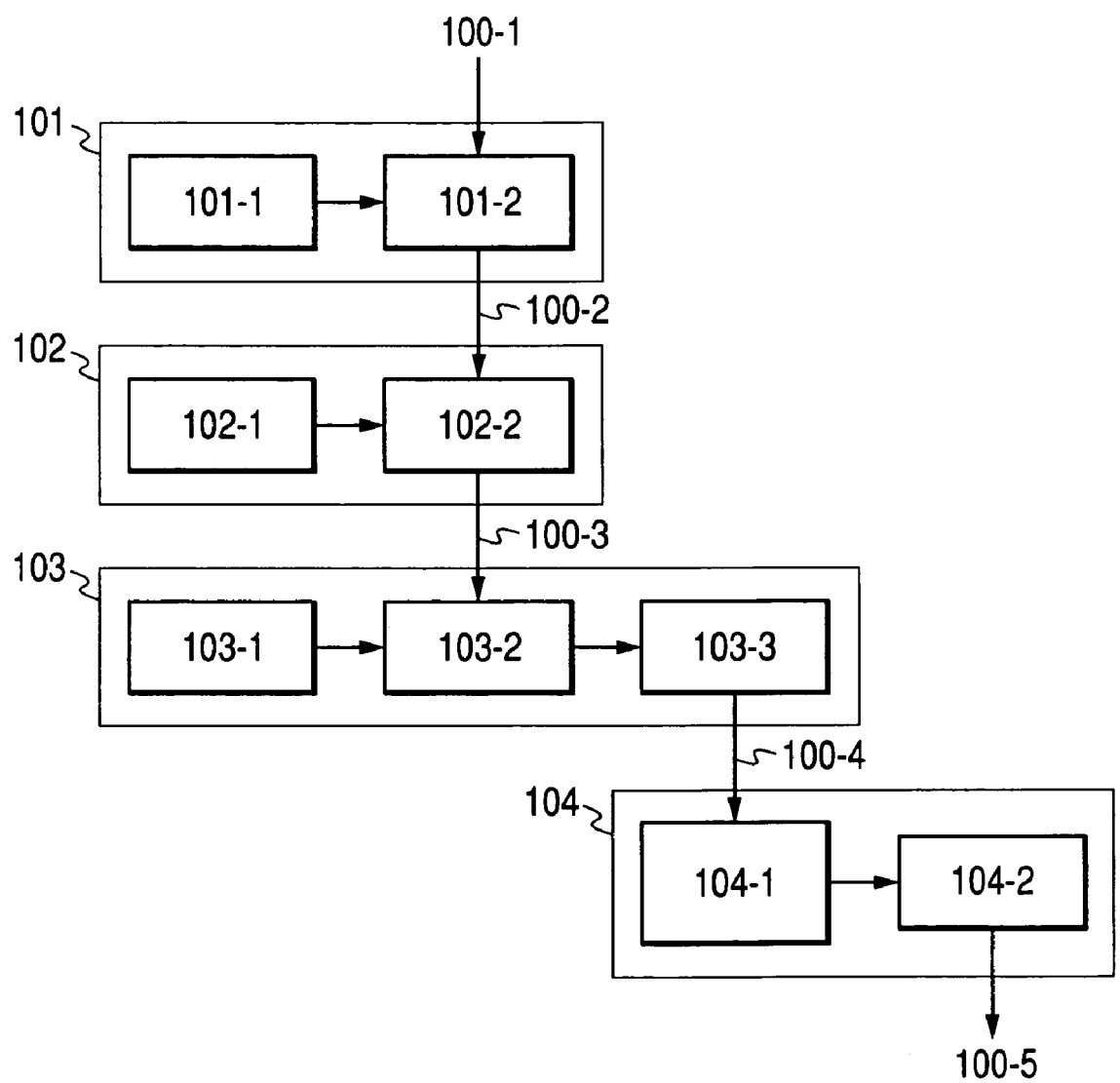
FIG. 1 is a block diagram showing a structure of a coordinate conversion parameter estimating apparatus according to a first embodiment of the present invention.

In view of the problems described above, it is an object of the present invention to provide an image deformation estimating method and apparatus that can obtain information expressing image deformation between frame images caused by camera shake with simple processing accurately and with almost no influence of photographing conditions. It is another object of the invention to provide a method and apparatus for detecting movement between frame images of a moving image having distortion such as a fish-eye image.

Best modes for carrying out the present invention are summarized as described below.

First Embodiment Mode

An image deformation estimating method according to a first embodiment mode includes: a first step of providing plural local areas in plural frame images, which form a moving image, and obtaining plural pieces of first information indicating movements among the plural frame images in the plural local areas, respectively; a second step of obtaining plural pieces of second information expressing image deformation of each of the plural local areas, using the plural pieces of first information; a third step of preparing plural selected rules, selecting the plural pieces of second information for each of the selected rules, and obtaining second representative information representing the selected plural pieces of second information, for each of the selected rules; and a fourth step of obtaining third information expressing deformation of an entire image by use of the plural pieces of second representative information, which are obtained for the plural selected rules.

Second Embodiment Mode

In the image deformation estimating method according to the first embodiment mode: the first information includes movement vectors; and the second information and the third information include coordinate conversion parameters.

Third Embodiment Mode

In the image deformation estimating method according to the first embodiment mode, the movements are caused by movement of an image pickup apparatus for photographing moving images.

Fourth Embodiment Mode

In the image deformation estimating method according to the first embodiment mode, the third step includes obtaining a frequency distribution of the second information corresponding to a magnitude of the second information for each of the selected rules to obtain the third information on the basis of the frequency distribution.

Fifth Embodiment Mode

In the image deformation estimating method according to the fourth embodiment mode, the third step includes convoluting a function having a single peak with the frequency distribution to set a largest piece of the second information obtained by the convolution as the second representative information.

Sixth Embodiment Mode

In the image deformation estimating method according to the first embodiment mode, the fourth step includes obtaining the third information so as to minimize a weighted error calculated based on at least one of a number of the local areas, which are used for obtaining the respective pieces of the second representative information among the plural pieces of second representative information, and a distance from a reference position in the image.

Seventh Embodiment Mode

In the image deformation estimating method according to the first embodiment mode: the first step includes providing the plural local areas in accordance with a predetermined arrangement condition; and the respective selected rules are rules for selecting the second information corresponding to the local areas provided in accordance with the same arrangement condition.

Eighth Embodiment Mode

In the image deformation estimating method according to the first embodiment mode: the frame images include fish-eye images, the image deformation estimating method further including a fifth step of applying correction processing for fish-eye deformation components to the first information; and the second step includes obtaining the second information using the first information subjected to the correction processing.

Ninth Embodiment Mode

An image deformation estimating program according to a ninth embodiment mode is a program for causing a computer to execute the image deformation estimating method according to the first embodiment mode.

Tenth Embodiment Mode

An image deformation estimating method according to a tenth embodiment mode includes: a first step of providing plural local area in plural frame images, which form a moving image, and obtaining plural pieces of first information indicating movements among the plural frame images in the plural local areas, respectively; a second step of decomposing the respective pieces of first information into plural pieces of second information expressing plural image deformation components, different from each other, of each of the plural local areas; a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and a fourth step of obtaining third information expressing deformation of an entire image by use of the plural pieces of second representative information obtained for the plural image deformation components and the plural selected rules.

Eleventh Embodiment Mode

In the image deformation estimating method according to the tenth embodiment mode: the first information includes movement vectors; and the second information and the third information include coordinate conversion parameters.

Twelfth Embodiment Mode

In the image deformation estimating method according to the tenth embodiment mode, the movements are caused by movement of an image pickup apparatus for photographing moving images.

Thirteenth Embodiment Mode

In the image deformation estimating method according to the tenth embodiment mode, the plural image deformation components includes at least one of horizontal movement components, magnification and reduction components, and rotation components.

Fourteenth Embodiment Mode

In the image deformation estimating method according to the tenth embodiment mode, the third step includes obtaining a frequency distribution of the second information corresponding to a magnitude of the second information for each of the image deformation components and for each of the selected rules to obtain the second representative information on the basis of the frequency distribution.

Fifteenth Embodiment Mode

In the image deformation estimating method according to the fourteenth embodiment mode, the third step includes convoluting a function having a single peak with the frequency distribution to set a largest piece of the second information obtained by the convolution as the second representative information.

Sixteenth Embodiment Mode

In the image deformation estimating method according to the tenth embodiment mode, the fourth step includes obtaining the third information so as to minimize a weighted error calculated based on at least one of a number of the local areas, which are used for obtaining the respective pieces of the second representative information among the plural pieces of second representative information, and a distance from a reference position in the image.

Seventeenth Embodiment Mode

In the image deformation estimating method according to the tenth embodiment mode: the first step includes providing the plural local areas in accordance with a predetermined arrangement condition; and the respective selected rules are rules for selecting the second information corresponding to the local areas provided in accordance with the same arrangement condition.

Eighteenth Embodiment Mode

In the image deformation estimating method according to the tenth embodiment mode: the frame images includes fish-eye images, the image deformation estimating method further including a fifth step of applying correction processing for fish-eye deformation components to the first information; and the second step includes decomposing the respective pieces of first information subjected to the correction processing into the plural pieces of second information.

Nineteenth Embodiment Mode

In the image deformation estimating method according to the tenth embodiment mode: the frame images include fish-eye images, the image deformation estimating method further including a fifth step of applying correction processing for fish-eye deformation components to the first information; and the third step includes obtaining the second representative information by use of the second information subjected to the correction processing.

Twentieth Embodiment Mode

An image deformation estimating program according to a twentieth embodiment mode is a program for causing a computer to execute the image deformation estimating method according to the tenth embodiment mode.

Twenty-first Embodiment Mode

An image deformation estimating apparatus according to a twenty-first embodiment mode includes: first means for providing plural local areas in plural frame images, which form a moving image, and obtaining plural pieces of first information indicating movements among the plural frame images in the plural local areas, respectively; second means for obtaining plural pieces of second information, which express image deformation of each of the plural local areas, by use of the plural pieces of first information; third means for preparing plural selected rules, selecting the plural pieces of second information for each of the selected rules, and obtaining second representative information, which represents the selected plural pieces of second information, for each of the selected rules; and fourth means for obtaining third information expressing deformation of an entire image by use of the plural pieces of second representative information, which are obtained for the plural selected rules.

Twenty-second Embodiment Mode

In the image deformation estimating apparatus according to the twenty-first embodiment mode: the first information includes movement vectors; and the second information and the third information include coordinate conversion parameters.

Twenty-third Embodiment Mode

In the image deformation estimating apparatus according to the twenty-first embodiment mode, the movements are caused by movement of an image pickup apparatus for photographing moving images.

Twenty-fourth Embodiment Mode

In the image deformation estimating apparatus according to the twenty-first embodiment mode, the third step includes obtaining a frequency distribution of the second information corresponding to a magnitude of the second information for each of the selected rules to obtain the third information on the basis of the frequency distribution.

Twenty-fifth Embodiment Mode

In the image deformation estimating apparatus according to the twenty-fourth embodiment mode, the third step includes convoluting a function having a single peak with the frequency distribution to set a largest piece of the second information obtained by the convolution as the second representative information.

Twenty-sixth Embodiment Mode

In the image deformation estimating apparatus according to the twenty-first embodiment mode, the fourth step includes obtaining the third information so as to minimize a weighted error calculated based on at least one of a number of the local areas, which are used for obtaining the respective pieces of the second representative information among the plural pieces of second representative information, and a distance from a reference position in the image.

Twenty-seventh Embodiment Mode

In the image deformation estimating apparatus according to the twenty-first embodiment mode: the first step includes providing the plural local areas in accordance with a predetermined arrangement condition; and the respective selected rules are rules for selecting the second information corresponding to the local areas provided in accordance with the same arrangement condition.

Twenty-eighth Embodiment Mode

In the image deformation estimating apparatus according to the twenty-first embodiment mode: the frame images include fish-eye images, the image deformation estimating apparatus further including a fifth step of applying correction processing for fish-eye deformation components to the first information; and the second step includes obtaining the second information by use of the first information subjected to the correction processing.

Twenty-ninth Embodiment Mode

An image pickup apparatus according to a twenty-ninth embodiment mode includes: the image deformation estimating apparatus according to the twenty-first embodiment mode; and an image pickup system for photographing moving images.

Thirtieth Embodiment Mode

An image deformation estimating apparatus according to a thirtieth embodiment mode includes: a first means for providing plural local area in plural frame images, which form a moving image, and obtaining plural pieces of first information indicating movements among the plural frame images in the plural local areas, respectively; a second means for decomposing the respective pieces of first information into plural pieces of second information expressing plural image deformation components, different from each other, of each of the plural local areas; a third means for preparing plural selected rules, selecting plural pieces of the second information for each of the image deformation components and for each of the selected rules, and obtaining second representative information, which represents the selected plural pieces of second information, for each of the image deformation components and for each of the selected rules; and a fourth means for obtaining third information expressing deformation of an entire image by use of the plural pieces of second representative information obtained for the plural image deformation components and the plural selected rules.

Thirty-first Embodiment Mode

In the image deformation estimating apparatus according to the thirtieth embodiment mode: the first information includes movement vectors; and the second information and the third information include coordinate conversion parameters.

Thirty-second Embodiment Mode

In the image deformation estimating apparatus according thirtieth embodiment, wherein the movements are caused by movement of an image pickup apparatus for photographing moving images.

Thirty-third Embodiment Mode

In the image deformation estimating apparatus according to the thirtieth embodiment mode, the plural image deformation components include at least one of horizontal movement components, magnification and reduction components, and rotation components.

Thirty-fourth Embodiment Mode

In the image deformation estimating apparatus according to the thirtieth embodiment mode, the third means obtains a frequency distribution of the second information corresponding to a magnitude of the second information for each of the image deformation components and for each of the selected rules to obtain the second representative information on the basis of the frequency distribution.

Thirty-fifth Embodiment Mode

In the image deformation estimating apparatus according to the thirty-fourth embodiment mode, the third means convolutes a function having a single peak with the frequency distribution to set a largest piece of the second information obtained by the convolution as the second representative information.

Thirty-sixth Embodiment Mode

In the image deformation estimating apparatus according to the thirtieth embodiment mode, the fourth means obtains the third information so as to minimize a weighted error calculated based on at least one of a number of the local areas, which are used for obtaining the respective pieces of the second representative information among the plural pieces of second representative information, and a distance from a reference position in the image.

Thirty-seventh Embodiment Mode

In the image deformation estimating apparatus according to the thirtieth embodiment mode: the first means provides the plural local areas in accordance with a predetermined arrangement condition; and the respective selected rules are rules for selecting the second information corresponding to the local areas provided in accordance with the same arrangement condition.

Thirty-eighth Embodiment Mode

In the image deformation estimating apparatus according to the thirtieth embodiment mode: the frame images includes fish-eye images, the image deformation estimating apparatus further including a fifth means for applying correction processing for fish-eye deformation components to the first information; and the second means decomposes the respective pieces of first information subjected to the correction processing into the plural pieces of second information.

Thirty-ninth Embodiment Mode

In the image deformation estimating apparatus according to the thirtieth embodiment mode: the frame images include fish-eye images, the image deformation estimating apparatus further including a fifth means for applying correction processing for fish-eye deformation components to the first information; and the third means obtains the second representative information by use of the second information subjected to the correction processing.

Fortieth Embodiment Mode

An image pickup apparatus according to a fortieth embodiment mode includes: the image deformation estimating apparatus according to the thirtieth embodiment; and an image pickup system for photographing moving images.

The embodiment modes described above will be hereinafter explained in detail with reference to the accompanying drawings.

First Embodiment

Figure 17:
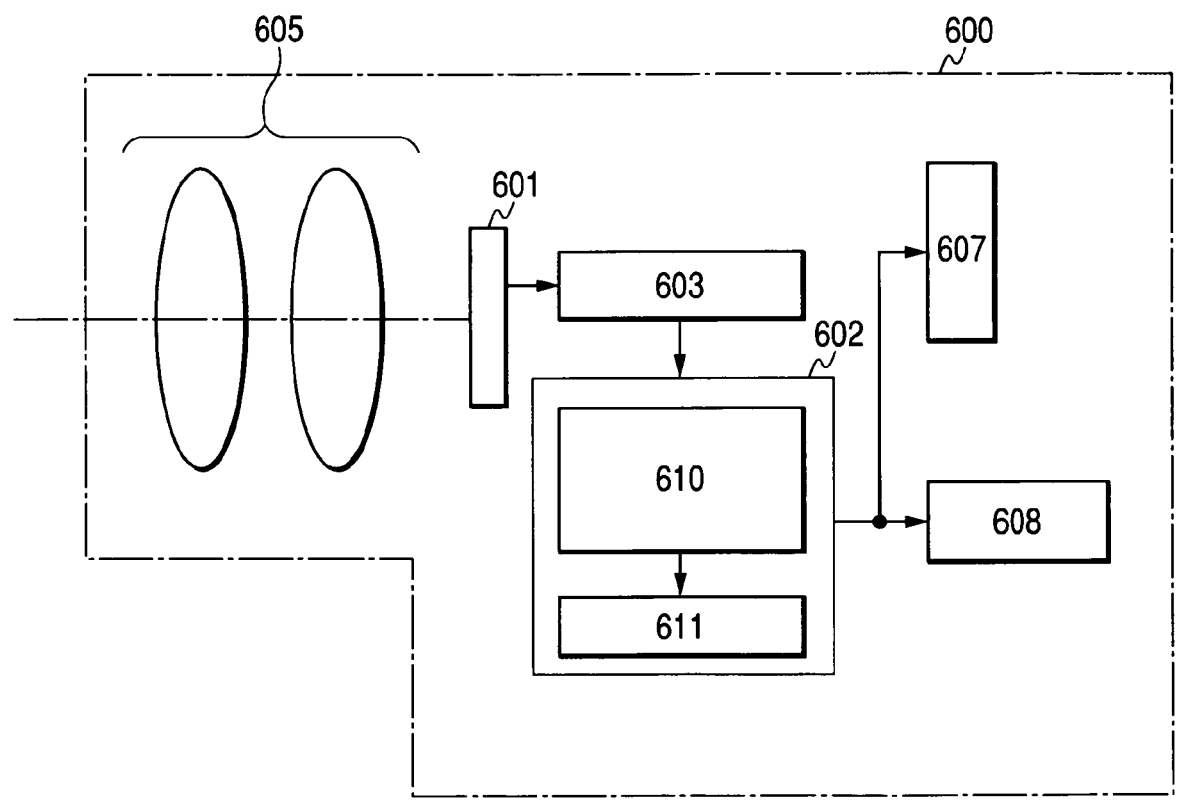
FIG. 17 is a schematic diagram of an image pickup apparatus mounted with the coordinate conversion parameter estimating apparatus according to each of the embodiments of the present invention.

FIG. 1 is a block diagram showing a structure of a coordinate conversion parameter estimating apparatus (also referred to as image deformation estimating apparatus; the same applies to embodiments described below) according to a first embodiment of the present invention. Note that, as shown in FIG. 17, a coordinate conversion parameter estimating apparatus 610 in this embodiment is mounted on an image pickup apparatus 600 capable of performing photographing moving images such as a digital camera or a video camera and is used as a shake detecting portion of a so-called hand shake correction system 602 of the image pickup apparatus 600. An image pickup system for photographing moving images is mounted on the image pickup apparatus 600. The image pickup system includes a photographing optical system 605, an image pickup element 601 such as a CCD sensor or a CMOS sensor, and a signal processing circuit 603 that processes a signal from the image pickup element 601 and generates a video signal. The hand shake correction system 602 includes a blur correction circuit 611 that corrects a blur of a video signal (a frame image) on the basis of an output (a coordinate conversion parameter representing a whole screen to be described later) from the coordinate conversion parameter estimating apparatus 610. The video signal (the frame image) subjected to blur correction in the blur correction circuit 611 is output to a monitor 607 or a recording medium (a semiconductor memory, an optical disk, a magnetic disk, etc.) 608 and displayed or recorded. This hand shake correction system may be provided as an apparatus separate from the image pickup apparatus. The same holds true for the embodiments described below.

Although not shown in FIG. 1, processing sequences of respective components shown in FIG. 1 are controlled by a controller that controls the entire coordinate conversion parameter estimating apparatus.

Figure 3:
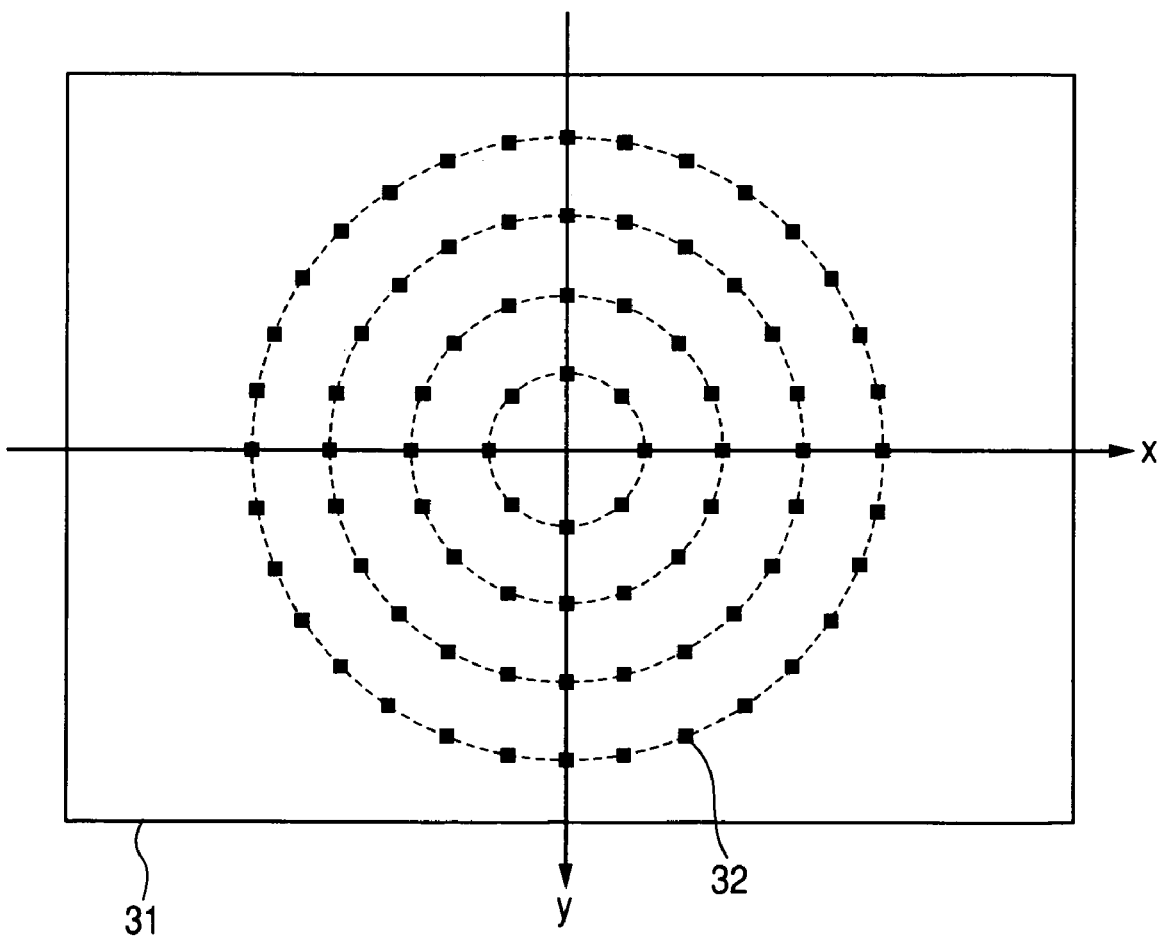
FIG. 3 is a schematic diagram showing an arrangement of detection points of movement.

In the figure, reference numeral 101 denotes a local movement detecting portion. The local movement detecting portion 101 detects a local movement vector between frame images constituting inputted moving image data 100-1. A movement detection point selecting circuit 101-1 is a circuit that designates coordinates of detection points where movement detection is performed. The detection points may be set by a unit of a pixel or by a unit of a small area including plural pixels. It is possible to set positions and arrangements of the detection points arbitrarily. In this embodiment, as shown in FIG. 3, plural detection points 32 are arranged on plural concentric circles having a central position of an image 31 as a center, respectively. More specifically, the plural detection points 32 are arranged on the respective concentric circles such that the detection points 32 are present in positions point-symmetrical to one another with respect to the image center.

Reference numeral 101-2 denotes a movement detection circuit. The movement detection circuit 101-2 performs block matching (or any other methods than block matching) in coordinates designated by the movement detection point selecting circuit 101-1 and calculates movement vectors at the respective detection points (first information).

Reference numeral 102 denotes a local parameter calculating portion that calculates coordinate conversion parameters (second information) according to a local operation. The local parameter calculating portion 102 calculates four coordinate conversion parameters, namely, a, b, c, and d in Expression (1), from a predetermined number of local movement vectors among inputted movement vectors 100-2.

A movement vector selecting circuit 102-1 selects movement vectors at two detection points that are in a point-symmetrical positional relation. A local parameter calculating circuit 102-2 calculates coordinate conversion parameters from the selected movement vectors at two detection points. The coordinate conversion parameters calculated here are calculated by use of the two movement vectors detected locally. These coordinate conversion parameters will be hereinafter referred to as local coordinate conversion parameters 100-3. Plural local coordinate conversion parameters are calculated by use of movement vectors at two detection points different from each other.

Reference numeral 103 denotes a rule representing parameter calculating portion that calculates coordinate conversion parameters representing selected rules to be described later. The rule representing parameter calculating portion 103 selects plural local coordinate conversion parameters in accordance with predetermined selected rules and calculates a coordinate conversion parameter (second representative information) as a representative value of the selected local coordinate conversion parameters. Specifically, plural local coordinate conversion parameters for the respective selected rules are selected in a local parameter selecting circuit 103-1.

Figure 4:
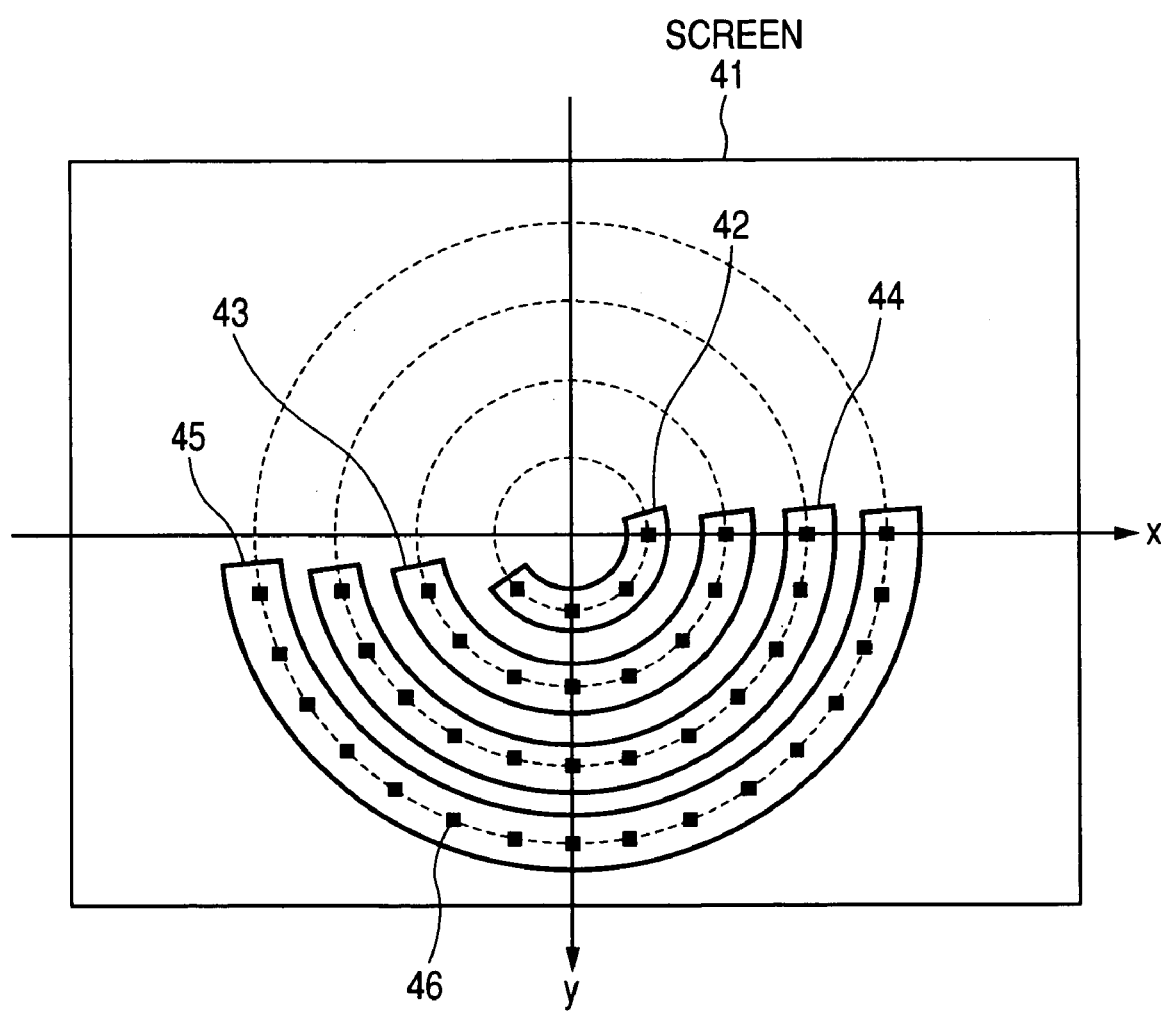
FIG. 4 is a schematic diagram showing selected rules for a coordinate conversion parameter according to a local operation.

In this embodiment, as shown in FIG. 4, four selected rules 1 to 4 (42, 43, 44, and 45) are set. The selected rule 1 is a rule for selecting coordinate conversion parameters on a concentric circle 42 having the smallest diameter among four concentric circles having different diameters. The selected rule 2 is a rule for selecting coordinate conversion parameters on a concentric circle 43 having a second smallest diameter. The selected rule 3 is a rule for selecting coordinate conversion parameters on a concentric circle 44 having a second largest diameter. The selected rule 4 is a rule for selecting coordinate conversion parameters on a concentric circle 45 having the largest diameter. The local parameter selecting circuit 103-1 selects plural local coordinate conversion parameters for each of the selected rules in accordance with the selected rules 1 to 4. A frequency distribution creating circuit 103-2 creates a frequency distribution of the plural coordinate conversion parameters selected for each of the concentric circles.

The frequency distribution creating circuit 103-2 convolutes a Gaussian function with the created frequency distribution. A rule representing parameter calculating circuit 103-3 evaluates the frequency distribution of the local coordinate conversion parameters for each of the concentric circles (i.e., for each of the selected rules) and calculates a coordinate conversion parameter representing the respective selected rules on the basis of the evaluation. The coordinate conversion parameter representing the selected rules is a coordinate conversion parameter that is calculated from and represents the plural local coordinate conversion parameters selected in accordance with the selected rules. In this embodiment, this coordinate conversion parameter will be hereinafter referred to as a rule representing coordinate conversion parameter. In this way, one rule representing coordinate conversion parameter is calculated for each of the concentric circles. In the case shown in FIG. 4, four rule representing coordinate conversion parameters representing the four selected rules, respectively, are calculated. Here, the number of selected rules, that is, the number of concentric circles connecting detection points is not limited to four and may be any number equal to or larger than 1. However, it is desirable that there are plural selected rules, preferably, three or more selected rules.

Reference numeral 104 denotes a whole screen representing parameter calculating portion. The whole screen representing parameter calculating portion 104 calculates a coordinate conversion parameter representing deformation of a whole screen caused by a camera shake (hereinafter referred to as whole screen representing coordinate conversion parameter: third information). Reference numeral 104-1 denotes a weighted error calculating circuit. The weighted error calculating circuit 104-1 calculates weighted errors between rule representing coordinate conversion parameters for each of the concentric circles calculated by the rule representing parameter calculating portion 103. Reference numeral 104-2 denotes a whole screen representing parameter calculating circuit. The whole screen representing parameter calculating circuit 104-2 determines and outputs a coordinate conversion parameter, at which a weighted error is minimized, as a whole screen representing coordinate conversion parameter 100-5.

In this embodiment, a weight multiplied with an error in the weighted error calculating circuit 104-1 is set larger on the concentric circle at a larger distance from the center of the image. In FIG. 4, a weight of an error between a coordinate conversion parameter of the selected rule 4 (a concentric circle 45) and a representative value is the largest. It is needless to mention that errors may be weighted in a manner opposite to that in this embodiment depending on a situation. If possible, it is desirable that results of detection at detection points having different distances from the image center are weighted in manners different from each other.

With the coordinate conversion parameter estimating apparatus described above, it is possible to calculate a whole screen representing coordinate conversion parameter expressing deformation of a whole screen caused by a camera shake from movement vectors detected locally.

Figure 2:
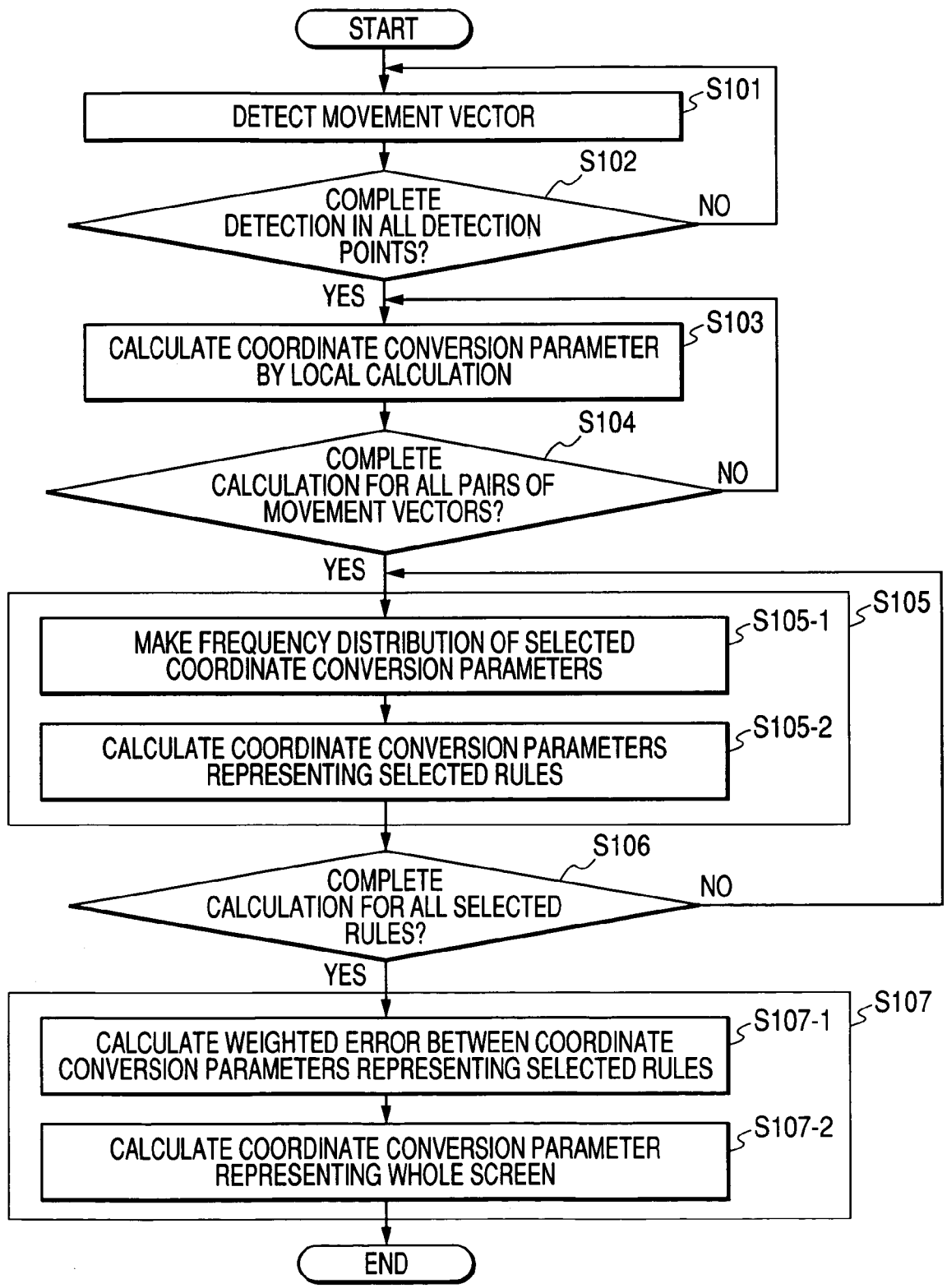
FIG. 2 is a flowchart showing a processing procedure of a coordinate conversion parameter estimating method according to the first embodiment of the present invention.

Next, a processing procedure in this embodiment will be explained in detail with reference to a flowchart in FIG. 2. First, the coordinate conversion parameter estimating apparatus performs processing in step S101 in the local movement detecting portion 101. In step S101, the coordinate conversion parameter estimating apparatus detects movement vectors at designated detection points. As shown in FIG. 3, detection points 32 are arranged on plural concentric circles in a screen 31. The coordinate conversion parameter estimating apparatus detects movement vectors using block matching at the respective detection points 32.

In step S102, the coordinate conversion parameter estimating apparatus judges whether the movement vector detection is completed for all the detection points. If the movement vector detection is completed for all the detection points (YES), the process proceeds to step S103. If the movement vector detection is not completed for all the detection points (NO), the process returns to step S101 to repeat the movement vector detection.

In step S103, the coordinate conversion parameter estimating apparatus calculates coordinate conversion parameters according to a local operation using movement vectors at the two detection points 32, which are in a point-symmetrical positional relation with respect to an image center, among the movement vectors detected in step S101. The coordinate conversion parameters are calculated as described below. A movement vector at the detection point 32 in coordinates (x, y) is expressed as indicated by the following expressions.

$$v_x(x, y)=(a-1)x+by+c \quad v_y(x, y)=-bx+(a-1)y+d \tag{3}$$

A movement vector in a position (−x, −y) point-symmetrical to the coordinates (x, y) is expressed as follows, $$v_x(-x,-y)=-(a-1)x-by+c \quad v_y(-x,-y)=bx-(a-1)y+d \tag{4}$$

where, $v_x$ and $v_y$ are an x component and a y component of the movement vectors detected in the respective positions. Local coordinate conversion parameters of the respective positions are calculated as indicated by the following expressions from the above expressions.

$$a = \frac{1}{2}\left[\frac{x}{x^2+y^2}\{v_x(x, y) - v_x(-x, -y)\} + \frac{y}{x^2+y^2}\{v_y(x, y) - v_y(-x, -y)\}\right] + 1 \tag{5}$$

$$b = \frac{1}{2}\left[\frac{y}{x^2+y^2}\{v_x(x, y) - v_x(-x, -y)\} - \frac{x}{x^2+y^2}\{v_y(x, y) - v_y(-x, -y)\}\right]$$

$$c = \frac{1}{2}\{v_x(x, y) + v_x(-x, -y)\}$$

$$d = \frac{1}{2}\{v_y(x, y) + v_y(-x, -y)\}$$

In this embodiment, the coordinate conversion parameter estimating apparatus calculates coordinate conversion parameters using Expression (5) from the two movement vectors in the point-symmetrical positions with respect to the image center.

In step S104, the coordinate conversion parameter estimating apparatus judges whether local coordinate conversion parameters are calculated for a pair of movement vectors of all the detection points 32 in a point-symmetrical positional relation. If the local coordinate conversion parameters are calculated (YES), the process proceeds to step S105. If the local coordinate conversion parameters are not calculated (NO), the process returns to step S103 to repeat the calculation of local coordinate conversion parameters. In this embodiment, as shown in FIG. 4, it is assumed that the calculated local coordinate conversion parameters are calculated at detection points 46 in a lower half of the screen 41. The processing in steps S103 and S104 is performed in the local parameter calculating portion 102.

In step S105, the coordinate conversion parameter estimating apparatus determines a coordinate conversion parameter representing selected rules (a rule representing parameter). In this embodiment, as shown in FIG. 4, four selected rules (selected rules 1 to 4) are provided. The coordinate conversion parameter estimating apparatus selects plural local coordinate conversion parameters on four concentric circles 42 to 45 corresponding to the respective selected rules. The coordinate conversion parameter estimating apparatus groups the selected local coordinate conversion parameters for each of the selected rules. Then, the coordinate conversion parameter estimating apparatus calculates a rule representing coordinate conversion parameter, which is a representative value of the plural local coordinate conversion parameters, for each of the groups (i.e., each selected rule).

Figure 5A:
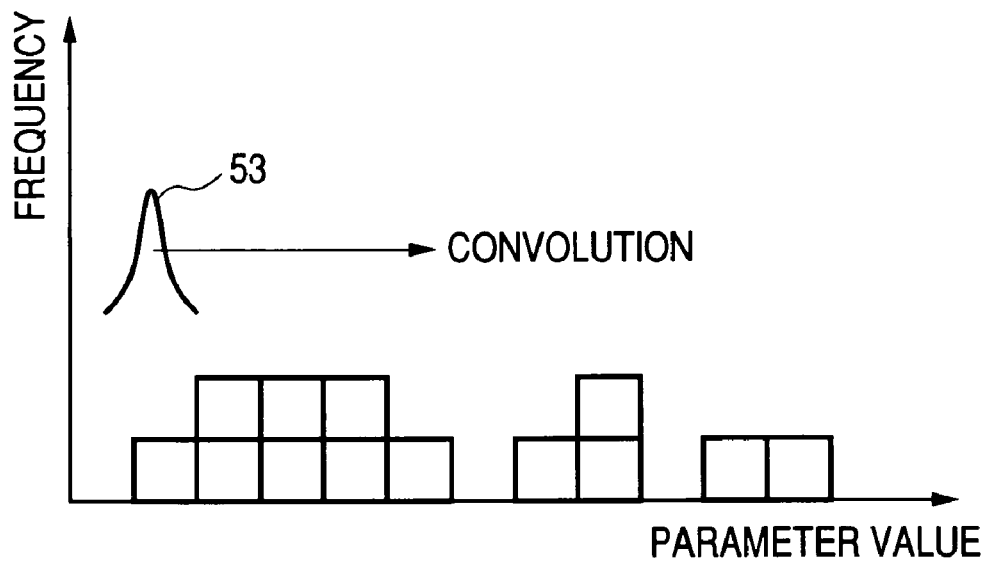
FIGS. 5A and 5B are schematic diagrams showing a state in which a single peak function is convoluted with a frequency distribution.
Figure 5B:
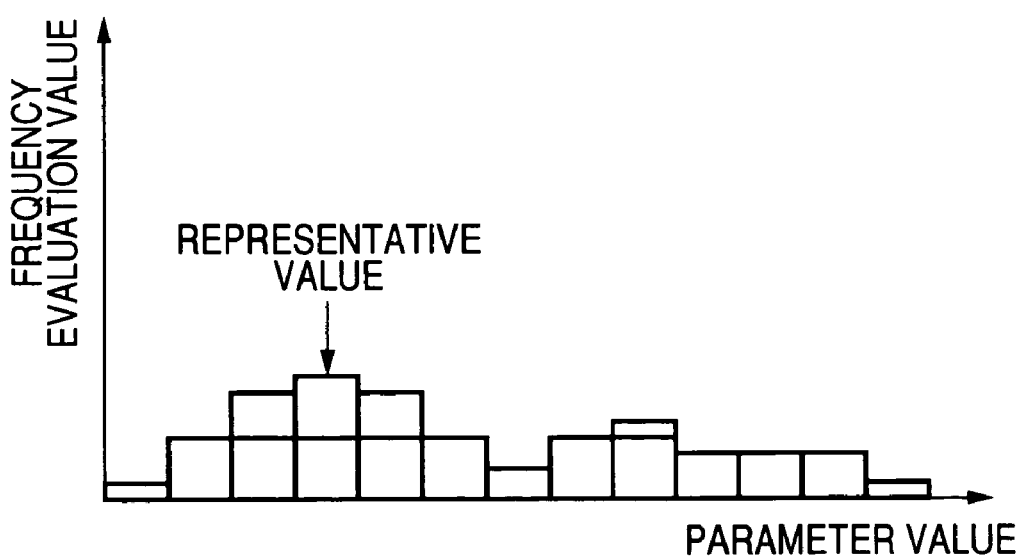

Specifically, first, in step S105-1, as shown in FIGS. 5A and 5B, the coordinate conversion parameter estimating apparatus creates a frequency distribution of the local coordinate conversion parameters selected in step S103 for each of the selected rules. The coordinate conversion parameter estimating apparatus further convolutes the Gaussian function with the created frequency distribution.

FIG. 5A schematically shows a frequency distribution of local coordinate conversion parameters selected on one concentric circle. FIG. 5B schematically shows a frequency distribution after convoluting a Gaussian function 53 with this frequency distribution.

In step S105-2, the coordinate conversion parameter estimating apparatus calculates a coordinate conversion parameter having the largest value in the frequency distribution after the convolution as a rule representing coordinate conversion parameter.

When a frequency distribution is created using coordinate conversion parameters on concentric circles, there may be no clear peak because the number of coordinate conversion parameters is small and an error is involved in movement detection. Thus, a Gaussian function with a single peak waveform is convoluted to smooth the frequency distribution such that a value having a marginal distribution tends to be the largest frequency. Consequently, a parameter value with a high frequency and a marginal distribution tends to be calculated as a representative value. Thus, it is possible to calculate a correct representative value for each of the concentric circles. The rule representing parameter calculating portion 103 performs the processing in S105. In step S106, the coordinate conversion parameter estimating apparatus judges whether representative values are calculated for all the selected rules. If representative values are calculated for all the selected rules (YES), the process proceeds to S107. If representative values are not calculated for all the selected rules (NO), the process returns to S105 to repeat the calculation of rule representing coordinate conversion parameters.

When rule representing coordinate conversion parameters are calculated for the respective selected rules, in step S107, the coordinate conversion parameter estimating apparatus calculates a coordinate conversion parameter (a whole screen representing parameter) representing the entire image. First, in step S107-1, the coordinate conversion parameter estimating apparatus calculates a weighted error among the four rule representing coordinate conversion parameters using Expression (6). Although only the parameter a is shown here, the coordinate conversion parameter estimating apparatus calculates errors for the parameters b, c, and d according to the same calculation, $$a^k = \sum_l w^k(l) \cdot |a^l - a^k|, \quad (6)$$

where, indexes affixed to a and w are the numbers of the selected rules (in this embodiment, the indices 1, 2, 3, and 4 are affixed in order from the concentric circle with the smallest diameter), and $w^k(l)$ expresses a weight of an error of a rule representing coordinate conversion parameter of the selected rule l with respect to a rule representing coordinate conversion parameter of the selected rule k.

As indicated by the above expression, absolute values of differences among rule representing coordinate conversion parameters of selected rules in question and rule representing coordinate conversion parameters of the other selected rules are calculated, the absolute values are multiplied by a weight, and the absolute values multiplied by the weight are summed up to obtain a weighted error in this context. The weight is set as indicated by the following expression, $$w^k(l) = w_n^k(l) \cdot w_r^k(l) \quad (7),$$

where $w_n^k(l)$ expresses a weight concerning a ratio of the number of local coordinate conversion parameters selected according to a k-th selected rule to the number of local coordinate conversion parameters selected according to an l-th selected rule. The weight corrects unevenness of the numbers of local coordinate conversion parameters selected according to the selected rules. When selected rules are set such that local coordinate conversion parameters are selected on concentric circles as in this embodiment, a larger number of local coordinate conversion parameters are selected on a concentric circle with a larger diameter. Therefore, the weight $w_n^k(l)$ is set larger for an error between a local coordinate conversion parameter and a coordinate conversion parameter representing a selected rule of a concentric circle having a larger diameter. In this embodiment, a ratio of the numbers of local coordinate conversion parameters selected for each of the selected rules is used, $$w_n^k(l) = \frac{N^l}{N^k}, \quad (8)$$

where $N^l$ and $N^k$ express numbers of local coordinate conversion parameters selected according to l-th and k-th selected rules, respectively, $w_r^k(l)$ expresses a weight concerning a ratio of distances from the image center of a local coordinate conversion parameter (a rule representing coordinate conversion parameter) representing the k-th selected rule to a local coordinate conversion parameter (a rule representing coordinate conversion parameter) representing the l-th selected rule. In this embodiment, a ratio of distances from the image center of positions of rule representing coordinate conversion parameters is used, $$w_r^k(l) = \frac{R^l}{R^k}, \quad (9)$$

where $R^l$ and $R^k$ express distances from the image center of positions of local coordinate conversion parameters (rule representing coordinate conversion parameters) representing l-th and k-th selected rules, respectively.

In rotation or magnification and reduction of an image, a movement vector is larger in a part closer to the peripheral part of the image. Therefore, a movement vector of very small magnification and reduction or rotation may appear only in the peripheral part of the image. Thus, in this embodiment, a weight is set larger for an error between a local coordinate conversion parameter and a rule representing coordinate conversion parameter having a larger distance from the image center. Consequently, it is possible to detect very small magnification and reduction, rotation, or the like that is not easily detected when coordinate conversion parameters in a screen are treated equally. Note that, in this embodiment, both the number of detection points used for calculating rule representing coordinate conversion parameters and the distances from the image center are taken into account for weighting of the rule representing coordinate conversion parameters. However, only one of the number of detection points and the distance may be taken into account to perform the weighting.

When weighted errors are calculated for coordinate conversion parameters representing all the selected rules, in step S107-2, the coordinate conversion parameter estimating apparatus determines a coordinate conversion parameter having the smallest calculated weighted error as a coordinate conversion parameter representing deformation of the whole screen.

In this way, in this embodiment, the coordinate conversion parameter estimating apparatus calculates the representative values (the rule representing coordinate conversion parameters) from the plural local coordinate conversion parameters selected for each of the selected rules on the basis of the frequency distribution thereof, compares the calculated representative values for the respective selected rules, and calculates the coordinate conversion parameter with the smallest error as the coordinate conversion parameter representing deformation of the whole screen (the whole screen representing coordinate conversion parameter). Since parameter values with a high frequency are calculated as representative values out of plural local coordinate conversion parameters, it is possible to extract a coordinate conversion parameter that is not affected by a local movement or an error at the time of movement detection, in other words, a coordinate conversion parameter that is predominant in the screen.

Further, a coordinate conversion parameter, at which an error is the smallest with respect to these plural representative values, is set as a representative value of the whole screen. Thus, it is possible to calculate an optimum coordinate conversion parameter that is hardly affected by movement unrelated to a camera shake and has a small error with respect to the entire image.

Even if wrong representative values are selected when representative values are selected using a frequency distribution, it is possible to reduce or eliminate an influence of the wrong representative values and perform highly accurate estimation by taking into account errors among the plural representative values.

Since the frequency distribution is smoothed with the Gaussian function, even when population parameter is small or when there is no clear peak or there are plural peaks, it is possible to perform highly accurate calculation of representative values taking into account marginal distributions. In addition, it is unnecessary to repeat calculation of coordinate conversion parameters in order to increase the population parameter and it is possible to suppress an increase in an amount of calculation.

A weight is set larger for an error between a coordinate conversion parameter and a coordinate conversion parameter representing a selected rule farther from the image center (with a larger diameter of a concentric circle). Thus, in calculation of a whole screen representing coordinate conversion parameter, since an influence of coordinate conversion parameters in the peripheral part of the image, where very small magnification and reduction, or rotation is easily detected, increases, it is possible to detect very small rotation or magnification and reduction of the image.

In the case explained in this embodiment, the movement detection points are arranged in a shape of plural concentric circles. However, in the present invention, the movement detection points may be arranged in, for example, a lattice shape instead of the shape of concentric circles. In addition, it is also possible to change a density of detection points in an image.

In the case explained in this embodiment, the local coordinate conversion parameters are calculated from movement vectors at two detection points in a point-symmetrical positional relation. However, the present invention is not limited to this and, for example, present local coordinate conversion parameters may be calculated using movement vectors at two detection points in a positional relation symmetrical with respect to an x-axis: [(x, y), (x, −y)]. In this case, it is possible to calculate the local coordinate conversion parameters using the following expressions. However, when the following expressions are used, detection points cannot be arranged on the x-axis.

$$a = \frac{1}{2y}\{v_y(x, y) + v_y(x, -y)\} + 1 \qquad (10)$$

$$b = \frac{1}{2y}\{v_x(x, y) - v_x(x, -y)\}$$

$$c = \frac{1}{2}\left[\{v_x(x, y) + v_x(x, -y)\} + \frac{x}{y}\{v_y(x, y) - v_y(x, -y)\}\right]$$

$$d = \frac{1}{2}\left[\frac{x}{y}\{v_x(x, y) - v_x(x, -y)\} + \{v_y(x, y) + v_y(x, -y)\}\right]$$

It is possible to reduce an amount of calculation by selecting different movement vectors for each parameter. For example, it is possible to reduce an amount of calculation by using movement vectors at two detection points symmetrical with respect to the x-axis for the parameters a and b and using movement vectors at two detection points point-symmetrical with respect to the image center for the parameters c and d to estimate coordinate conversion parameters.

In this embodiment, the local coordinate conversion parameters on the same concentric circle are set as one group and a representative value (a rule representing coordinate conversion parameter) is calculated from the group. However, it is also possible that a screen is divided into plural areas, local coordinate conversion parameters in the respective divided areas are set as one group, and a representative value of the group is calculated or the screen is grouped in a mosaic shape and a representative value of the group is calculated.

In this embodiment, the Gaussian function is convoluted with a frequency distribution. However, in the present invention, any function may be used instead of the Gaussian function as long as the function is a single peak function.

In this embodiment, a weighted error is calculated among coordinate conversion parameters representing selected rules and a coordinate conversion parameter having the smallest error is set as a coordinate conversion parameter representing the whole screen. However, the present invention is not limited to this and, for example, an average value of the coordinate conversion parameters representing the selected rules may be set as a coordinate conversion parameter representing the whole screen.

In this embodiment, when a weighted error among coordinate conversion parameters representing selected rules is calculated, a weight concerning a distance is set larger for an error between a coordinate conversion parameter representing a selected rule and a local coordinate conversion parameter on a concentric circle with a larger distance from the image center. However, the weight can be set for each coordinate conversion parameter. Concerning the parameters a and b expressing magnification and reduction or rotation of an image, the weight concerning a distance may be set larger for an error between a coordinate conversion parameter representing a selected rule and a coordinate conversion parameter of a concentric circle with a larger diameter. On the other hand, concerning the parameters c and d expressing a horizontal movement and a vertical movement, the weight concerning a distance may be set equal for errors among all the coordinate conversion parameters. In addition, in this embodiment, importance is attached to the peripheral part of the image in order to detect very small magnification and reduction or rotation. However, when it is desired to attach importance to deformation near the center of the image, a weight only has to be set larger for an error between a coordinate conversion parameter representing a selected rule and a representative value with a smaller distance from the image center.

Second Embodiment

Figure 6:
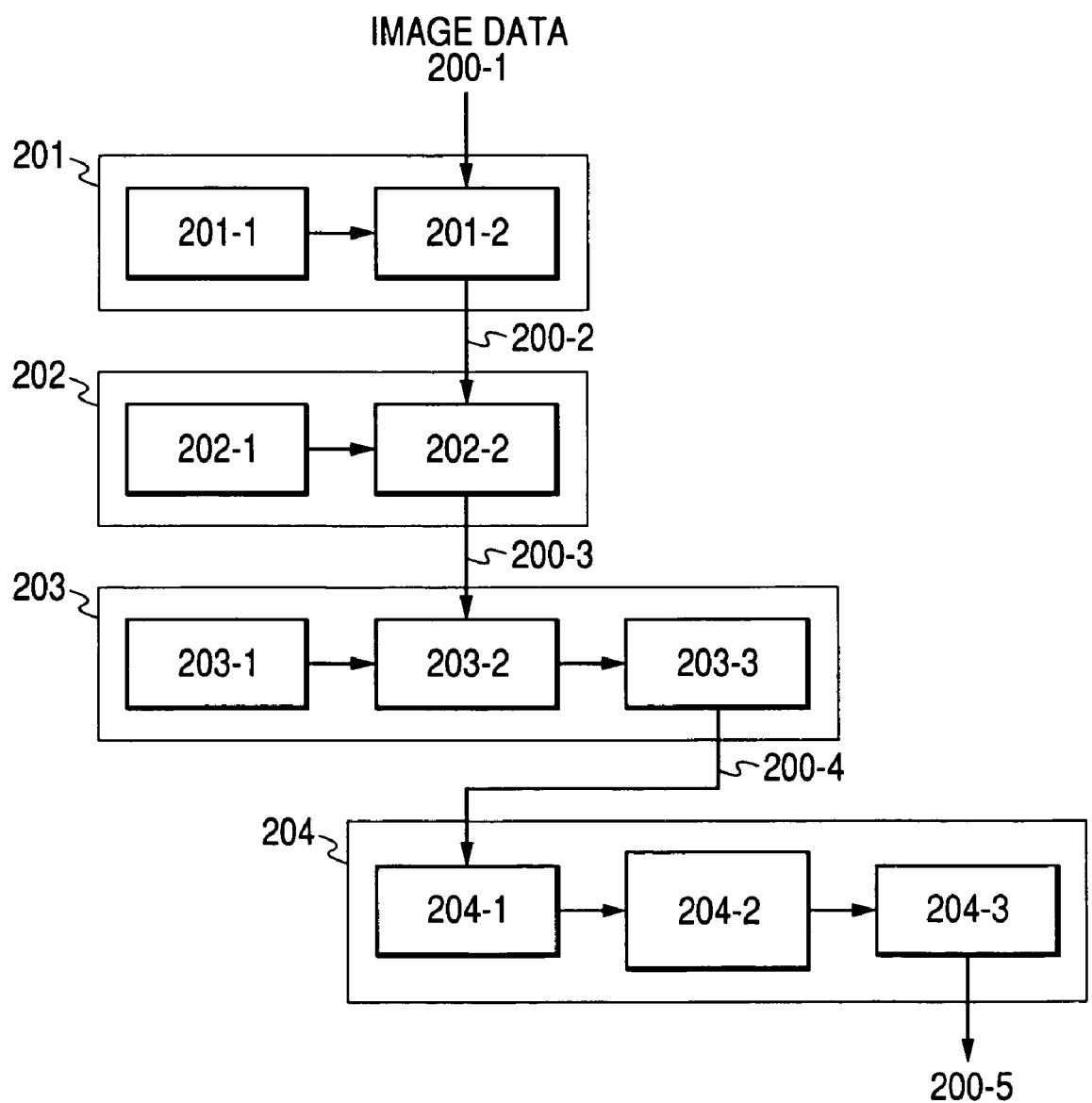
FIG. 6 is a block diagram showing a structure of a coordinate conversion parameter estimating apparatus according to a second embodiment of the present invention.

FIG. 6 is a block diagram of a structure of a coordinate conversion parameter estimating apparatus according to a second embodiment of the present invention. In the first embodiment, coordinate conversion parameters are calculated from movement vectors at plural detection points and various kinds of processing are applied to the coordinate conversion parameters to calculate a coordinate conversion parameter representing a whole screen. In the second embodiment, various kinds of processing are applied to movement vectors to calculate a coordinate conversion parameter representing a whole screen.

In FIG. 6, processing sequences of respective components are controlled by a controller (not shown) that controls the entire coordinate conversion parameter estimating apparatus.

In the figure, a local movement detecting portion 201, a movement detection point selecting circuit 201-1, and a movement detecting circuit 201-2 are the same as the respective counterparts in the first embodiment. Thus, explanations of these portions are omitted.

Reference numeral 202 denotes a movement component decomposing portion. The movement component decomposing portion 202 decomposes movement vectors (first information) 200-2 detected at detection points into movement components of magnification and reduction, rotation, horizontal movement, and vertical movement (image deformation components: second information). Specifically, first, a movement vector selecting circuit 202 selects movement vectors at two detection points in a point-symmetrical positional relation with respect to an image center. A movement component decomposing circuit 202-2 performs an arithmetic operation for decomposing the designated movement components into a magnification and reduction component, a rotation component, a horizontal movement component, and a vertical movement component.

Reference numeral 203 denotes a representative movement component calculating portion. In accordance with plural selected rules, the representative movement component calculating portion 203 selects plural movement components for each of the selected rules from decomposed movement components 200-3 and calculates rule representing movement components (second representative information) that are representative values of the respective selected rules.

Specifically, plural components for each of identical types of movement components in accordance with the respective selected rules are selected in a movement component selecting circuit 203-1. Frequency distributions concerning magnitudes of these selected plural movement components are created by a frequency distribution creating circuit 203-2 for each of the selected rules and each of the movement components.

In this embodiment, as in the first embodiment, the plural selected rules are set as rules for selecting movement components on an identical concentric circle, respectively.

The frequency distribution creating circuit 203-2 convolutes the Gaussian function with the created frequency distributions. A movement component calculating circuit 203-3 evaluates the frequency distributions of the respective movement components with respect to the respective selected rules and calculates rule representing movement components representing the selected rules and types of the movement components on the basis of the evaluation.

Consequently, representative values of the magnification and reduction component, the rotation component, the horizontal movement component, and the vertical movement component are calculated for each of the concentric circles (the selected rules).

Reference numeral 204 denotes a whole screen representing parameter calculating portion. The whole screen representing parameter calculating portion 204 calculates a coordinate conversion parameter (a whole screen representing coordinate conversion parameter) representing deformation of the whole screen caused by a camera shake from inputted rule representing movement components 200-4 of the respective selected rules.

Specifically, a rule representing parameter calculating circuit 204-1 obtains rule representing movement components for each of the selected rules and each of the types of the movement components from the representative movement component calculating portion 203 and calculates coordinate conversion parameters representing the selected rules (rule representing coordinate conversion parameters) from these rule representing movement components. When the rule representing coordinate conversion parameters for the respective selected rules are calculated, a weighted error calculating circuit 204-2 calculates a weighted error between the rule representing coordinate conversion parameters. A whole screen representing parameter calculating circuit 204-3 evaluates this weighted error and calculates a coordinate conversion parameter having the smallest error as a coordinate conversion parameter (a whole screen representing coordinate conversion parameter: third information) 200-5 representing the whole screen.

Figure 7:
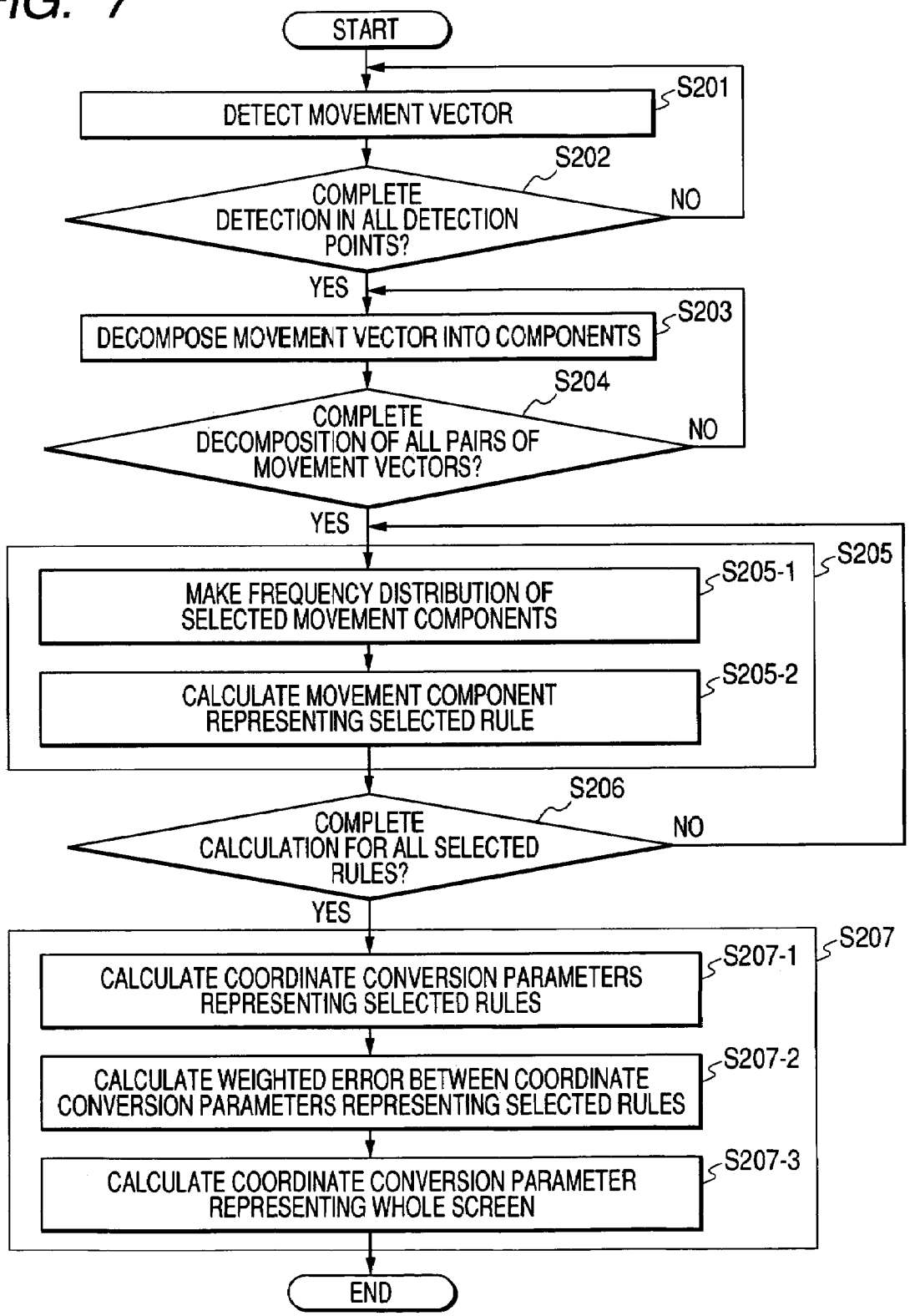
FIG. 7 is a flowchart showing a processing procedure of a coordinate conversion parameter estimating method according to the second embodiment of the present invention.

Next, a processing procedure in this embodiment will be explained in detail with reference to a flowchart in FIG. 7. Steps S201 and S202 are the same as steps S101 and S102 in the first embodiment. In steps S201 and S202, the coordinate conversion parameter estimating apparatus detects movement vectors using block matching at detection points arranged on plural concentric circles.

Figure 8:
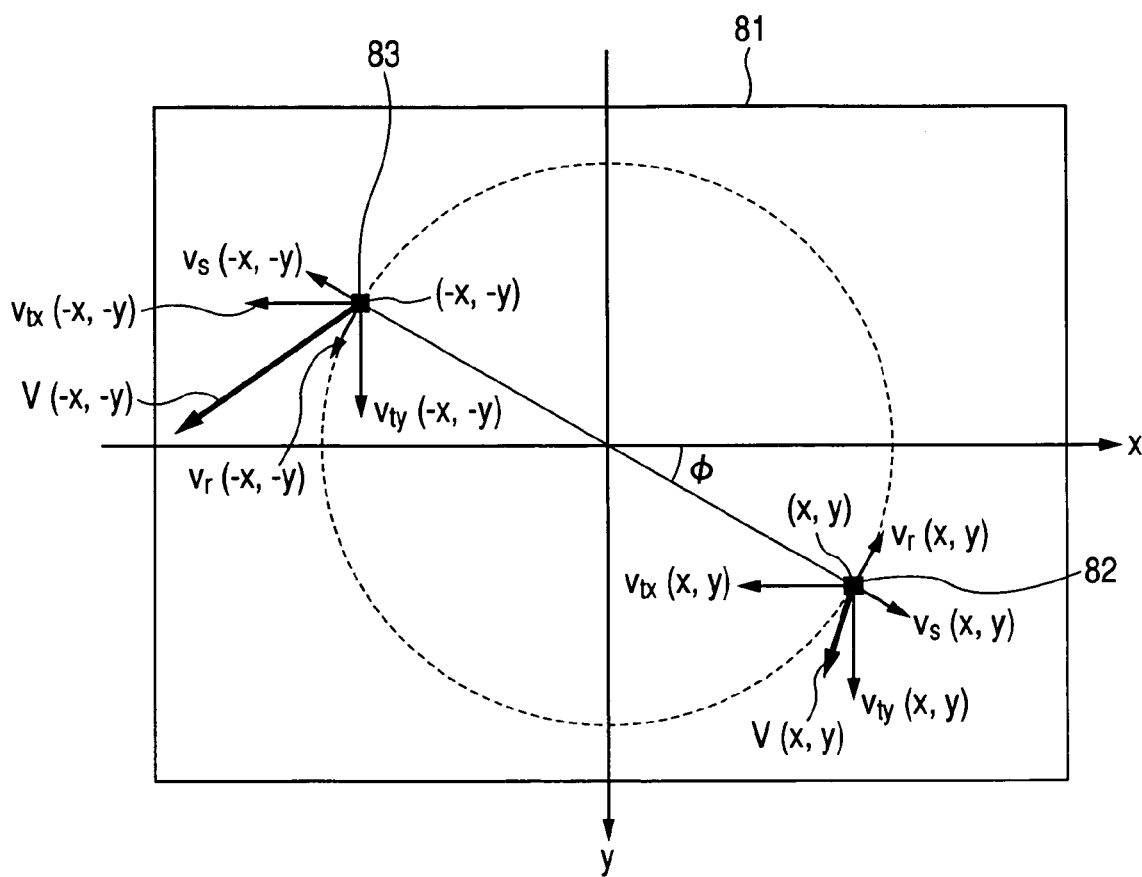
FIG. 8 is a schematic diagram showing movement vectors caused by camera shake at detection points that are in a point-symmetrical positional relation with respect to an image center.

Next, in step S203, the coordinate conversion parameter estimating apparatus decomposes the detected movement vectors into components of magnification and reduction, rotation, horizontal movement, and vertical movement. When it is assumed that movement vectors caused by a camera shake are constituted by magnification and reduction, rotation, vertical movement, and horizontal movement components, as shown in FIG. 8, on a screen 81, magnitudes of the respective components of movement vectors at detection points 82 and 83 in a point-symmetrical positional relation with respect to an image center are the same. Directions of the movement vectors are the same in the vertical movement and horizontal movement components and opposite in the magnification and reduction and rotation components.

Here, denoted by V(x, y) is a movement vector detected in a position of (x, y), $v_s(x, y)$, $v_r(x, y)$, $v_{tx}(x, y)$, and $v_{ty}(x, y)$ are magnification and reduction, rotation, vertical movement, and horizontal movement components forming V(x, y), respectively, $\phi$ is an angle formed by a line connecting the image center and the position (x, y) of the detection point and an x-axis. When a relation of these components is used, the following expression is obtained.

$$|v_{tx}(x, y) + v_{ty}(x, y)| = \frac{1}{2}|V(x, y) + V(-x, -y)| \quad (11)$$

$$|v_s(x, y) + v_r(x, y)| = \frac{1}{2}|V(x, y) - V(-x, -y)|$$

Thus, the components can be decomposed to the vertical movement and horizontal movement components and the magnification and reduction and rotation components easily. Consequently, the respective components can be decomposed as indicated by Expression (12).

$$|v_s(x, y)| = \frac{1}{2}[\{v_x(x, y) - v_x(-x, -y)\}\cos\phi + \quad (12)$$
$$\{v_y(x, y) - v_y(-x, -y)\}\sin\phi]$$

$$|v_r(x, y)| = -\frac{1}{2}[\{v_x(x, y) - v_x(-x, -y)\}\sin\phi +$$
$$\{v_y(x, y) - v_y(-x, -y)\}\cos\phi]$$

$$|v_{tx}(x, y)| = \frac{1}{2}\{v_x(x, y) + v_x(-x, -y)\}$$

$$|v_{ty}(x, y)| = \frac{1}{2}\{v_y(x, y) + v_y(-x, -y)\}$$

In step S203, the coordinate conversion parameter estimating apparatus decomposes the movement vectors at the two detection points in a point-symmetrical positional relation into magnification and reduction, rotation, vertical movement, and horizontal movement components using Expression (12). In step S204, the coordinate conversion parameter estimating apparatus judges whether the decomposition of the movement components is completed for all the pairs of movement vectors in a point-symmetrical positional relation. If the decomposition of the movement components is completed (YES), process proceeds to the next step. If the decomposition of the movement components is not completed (NO), the process repeats the processing in step S203. In the structure shown in FIG. 6, the coordinate conversion parameter estimating apparatus performs the processing in step S203 in the movement component decomposing portion 202.

In step S205, the coordinate conversion parameter estimating apparatus selects plural movement components of the decomposed movement components in accordance with predetermined selected rules and calculates a representative value of the movement components. First, in step S205-1, the coordinate conversion parameter estimating apparatus creates a frequency distribution of the respective four components, the magnification and reduction component, the rotation component, the vertical movement component, and the horizontal movement component decomposed from the movement vectors for each of the concentric circles (the selected rules). Further, the coordinate conversion parameter estimating apparatus convolutes the Gaussian function with the respective frequency distributions.

In step S205-2, the coordinate conversion parameter estimating apparatus calculates the largest value in the frequency distributions, with which the Gaussian function is convoluted, as a magnitude of a rule representing movement component representing the respective selected rules and the respective movement component.

In step S206, the coordinate conversion parameter estimating apparatus judges whether the processing in step S205 is completed for all the selected rules. When rule representing movement components are calculated in all the selected rules, the process proceeds to the next step. The coordinate conversion parameter estimating apparatus performs this processing in the representative movement component calculating portion 203 shown in FIG. 6.

Lastly, in step S207, the coordinate conversion parameter estimating apparatus calculates a coordinate conversion parameter representing the whole screen (a whole screen representing coordinate conversion parameter). First, in step S207-1, the coordinate conversion parameter estimating apparatus calculates coordinate conversion parameters from the rule representing movement components calculated in step S205. When the representative components calculated in step S205 are regarded as movement components on the x-axis, a relation between the coordinate conversion parameters and the representative movement components is as indicated by the following expression, $$a^i = \frac{|v_s|^i}{x} + 1, \quad (13)$$

$$b^i = -\frac{|v_r|^i}{x},$$

$$c^i = |v_{tx}(x, y)|,$$

$$d^i = |v_{ty}(x, y)|,$$

where x represents coordinate of an intersection of the concentric circle and the x-axis. An index is a number indicating a selected rule.

In step S207-1, the coordinate conversion parameter estimating apparatus calculates rule representing coordinate conversion parameters using Expression (13). In step S207-2, the coordinate conversion parameter estimating apparatus calculates a weighted error between the rule representing coordinate conversion parameters. In step S207-3, the coordinate conversion parameter estimating apparatus calculates a coordinate conversion parameter representing the whole screen.

The processing for calculating a coordinate conversion parameter representing the whole screen from the rule representing coordinate conversion parameters in steps S207-2 and S207-3 is the same as that in the first embodiment. The processing is performed by the whole screen representing parameter calculating portion 204 shown in FIG. 6.

In this embodiment, most of the coordinate conversion parameter estimating processing is arithmetic operations for movement vectors. However, the same effects as the first embodiment are obtained. In addition, as in the first embodiment, contents of this embodiment do not limit the present invention.

Third Embodiment

Figure 9:
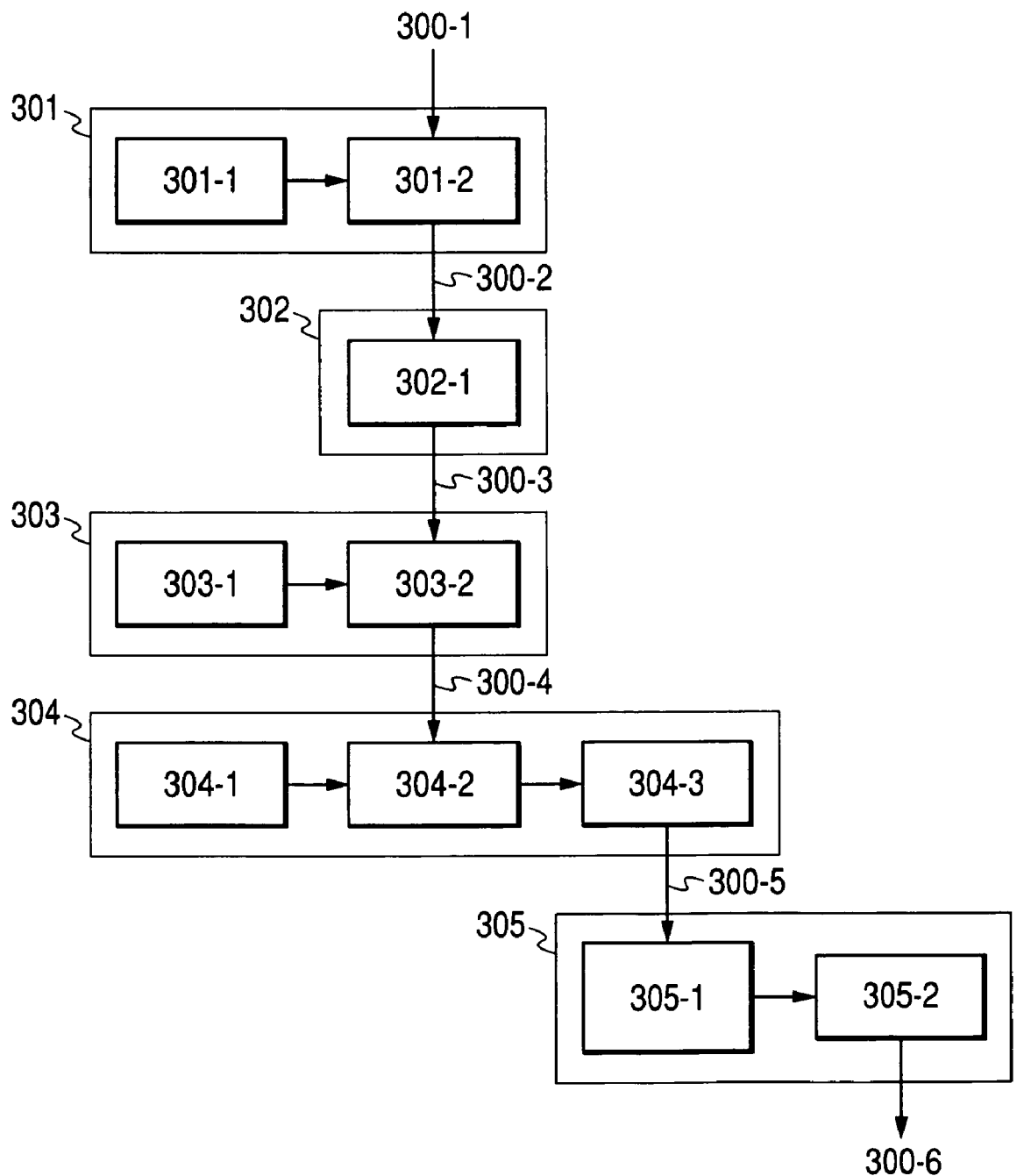
FIG. 9 is a block diagram showing a structure of a coordinate conversion parameter estimating apparatus according to a third embodiment of the present invention.

FIG. 9 is a block diagram showing a structure of a coordinate conversion parameter estimating apparatus according to a third embodiment of the present invention. In this embodiment, unlike the first and the second embodiments, the coordinate conversion parameter estimating apparatus estimates coordinate conversion parameters expressing image deformation between frame images caused by a camera shake from a fish-eye moving image that is photographed using a fish-eye optical system constituted by a fish-eye lens and a compound eye optical system.

Although not shown in the figure, processing sequences in respective components in FIG. 9 are controlled by a controller that controls the entire coordinate conversion parameter estimating apparatus.

In the figure, reference numeral 301 denotes a local movement detecting portion. The local movement detecting portion 301 detects movement vectors (first information) between frame images of moving image data (fish-eye moving image data) 300-1 that is photographed using a fish-eye optical system. As in the first and second embodiments, a movement detection position selecting circuit 301-1 designates coordinates of detection points where movement detection is performed, and a movement detecting circuit 301-2 performs block matching at the designated detection points and calculates movement vectors.

Reference numeral 302 denotes a fish-eye correcting portion. The fish-eye correcting portion 302 corrects fish-eye distortion (distortion caused by projection of a subject image by the fish-eye optical system; the distortion is larger in a part closer to a peripheral part of the image) of movement vectors 300-2 detected on the fish-eye image, with a movement vector fish-eye correcting circuit 302-1. The correction processing for the movement vectors will be described in detail later.

Reference numeral 303 denotes a local parameter calculating portion. The local parameter calculating portion 303 calculates coordinate conversion parameters (local coordinate conversion parameters: second information) according to a local operation from movement vectors 300-3 for which the fish-eye distortion is corrected. Specifically, movement vectors, for which the fish-eye distortion is corrected at two detection points in a point-symmetrical positional relation with respect to the image center, are selected by a movement vector selecting circuit 303-1. Local coordinate conversion parameters are calculated from the selected two movement vectors in a local parameter calculating circuit 303-2.

Reference numeral 304 denotes a rule representing parameter calculating portion. The rule representing parameter calculating portion 304 selects calculated local coordinate conversion parameters 300-4 in accordance with each of plural selected rules that are set as in the first embodiment and calculates a rule representing coordinate conversion parameter that is a representative value for each of the selected rules.

Specifically, plural local coordinate conversion parameters are selected for each of the selected rules in a local parameter selecting circuit 304-1, and a frequency distribution based on magnitudes of the selected plural local coordinate conversion parameters is created for each of the selected rules by a frequency distribution creating circuit 304-2. The frequency distribution creating circuit 304-2 convolutes the Gaussian function with the created frequency distributions.

A rule representing parameter calculating circuit 304-3 determines a parameter value taking a largest value among the convoluted frequency distributions as a coordinate conversion parameter representing the selected rules (a rule representing coordinate conversion parameters: second representative information).

Reference numeral 305 denotes a whole screen representing parameter calculating portion. The whole screen representing parameter calculating portion 305 calculates a coordinate conversion parameter representing deformation of a whole screen from rule representing coordinate conversion parameters 300-5 obtained for the plural selected rules. Specifically, the whole screen representing parameter calculating portion 305 calculates a weighted error among the rule representing coordinate conversion parameters representing the respective selected rules with a weighted error calculating circuit 305-1. The whole screen representing parameter calculating portion 305 calculates a rule representing coordinate conversion parameter having a smallest weighted error as a coordinate conversion parameter representing deformation of the whole screen (a whole screen representing coordinate conversion parameter: third information) 300-6 with a whole screen representing parameter calculating circuit 305-2. Note that the components 303 to 305 are the same as the counterparts in the first embodiment.

With the coordinate conversion parameter estimating apparatus described above, it is also possible to estimate a coordinate conversion parameter expressing deformation of the whole screen caused by a camera shake from a fish-eye moving image that is photographed using the fish-eye optical system.

Figure 10:
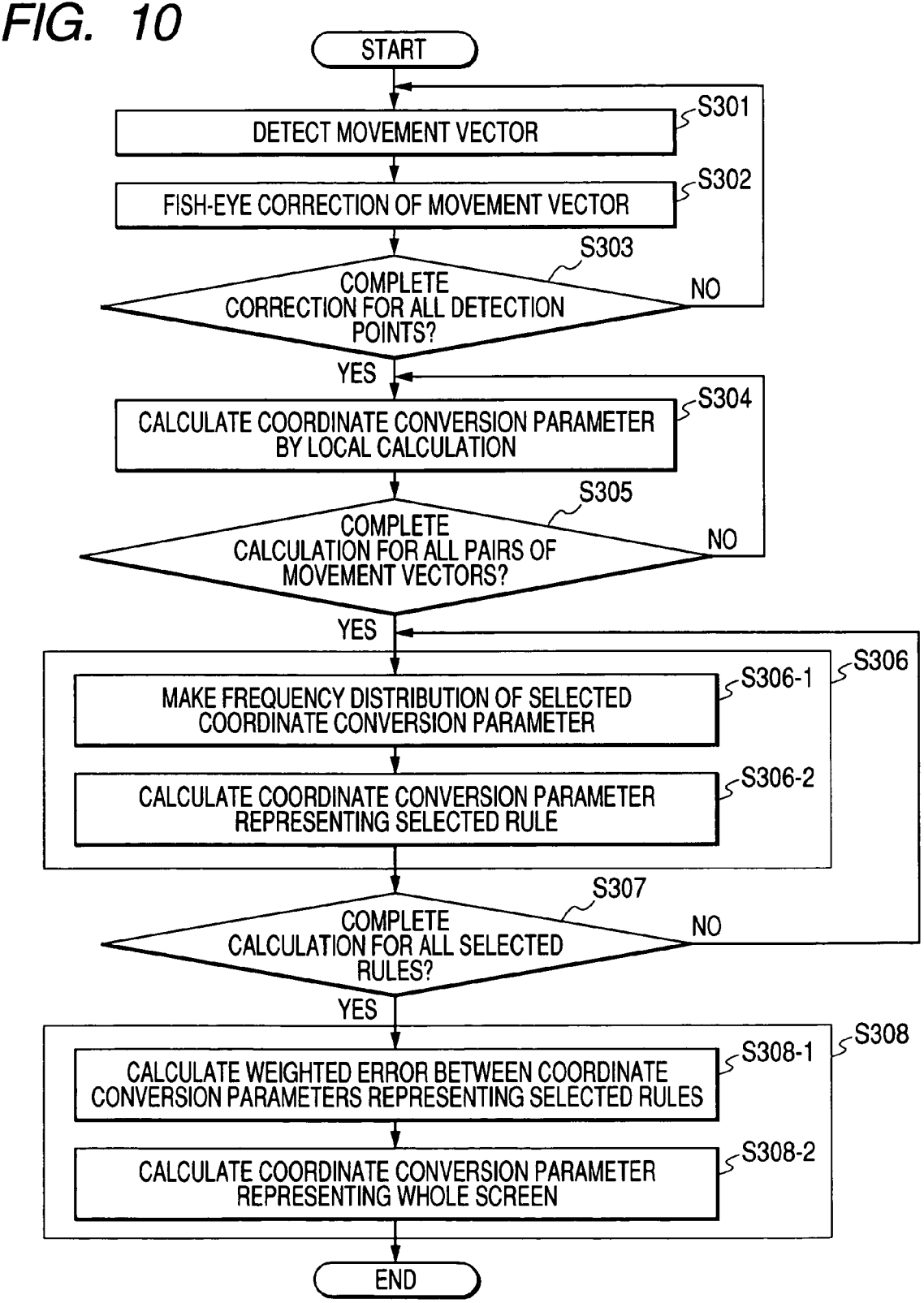
FIG. 10 is a flowchart showing a processing procedure of a coordinate conversion parameter estimating method according to the third embodiment of the present invention.

Next, a processing procedure in this embodiment will be explained in detail with reference to a flowchart in FIG. 10. Since step S304 and the subsequent steps are the same as the counterparts in the first embodiment, detailed explanations of the steps are omitted.

First, in step S301, the coordinate conversion parameter estimating apparatus detects movement vectors. As in the first embodiment, the coordinate conversion parameter estimating apparatus designates detection points to be arranged on plural concentric circles and detects movement vectors using block matching. In this embodiment, an input image is a fish-eye image photographed by a fish-eye optical system and fish-eye distortion has been caused in the movement vector detected here. This processing is performed in a local movement detecting portion 301.

Figure 11:
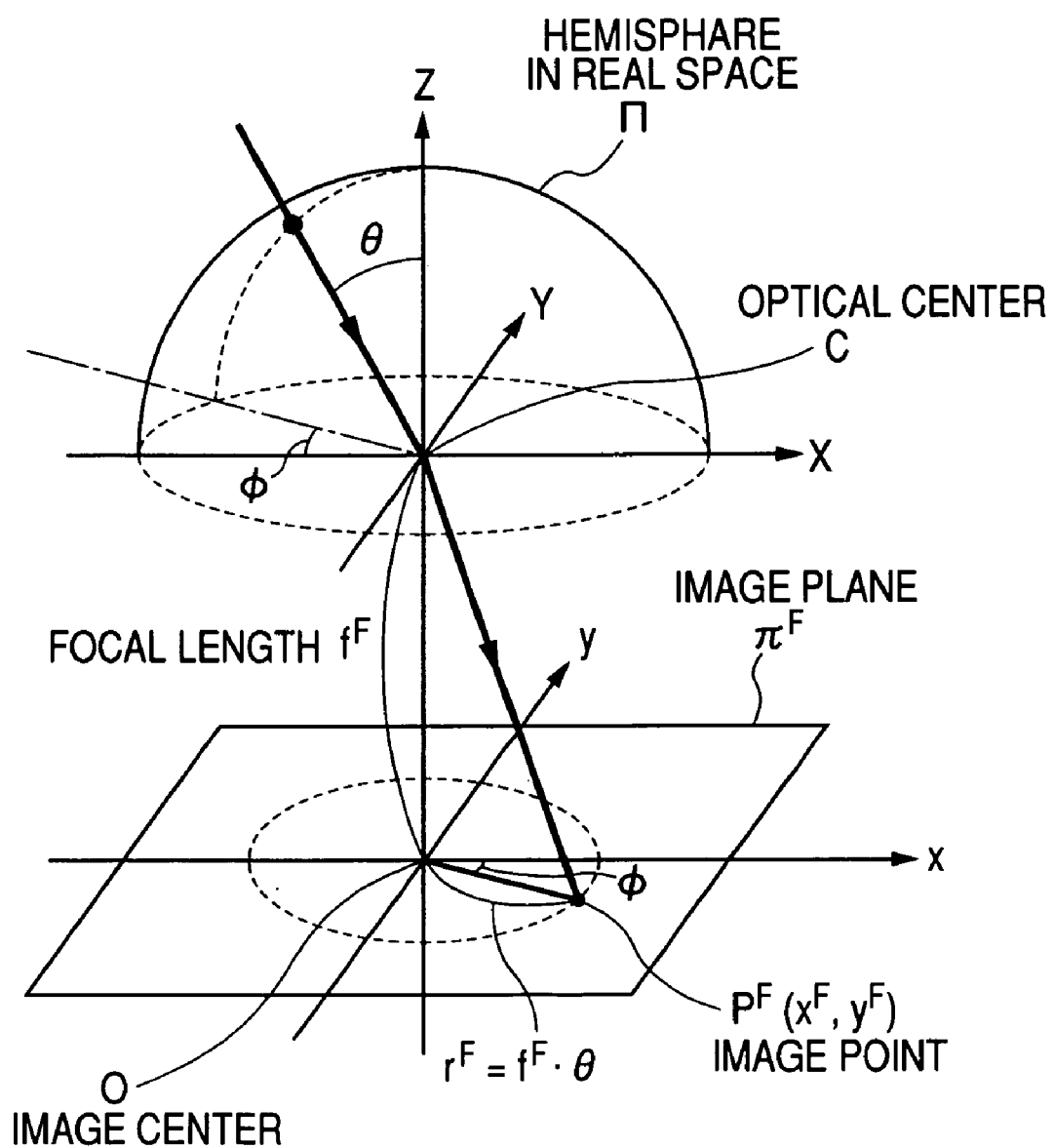
FIG. 11 is a schematic diagram showing a relation between an angle of incidence and an image height in a fish-eye optical system of an equidistant projection system.
Figure 12:
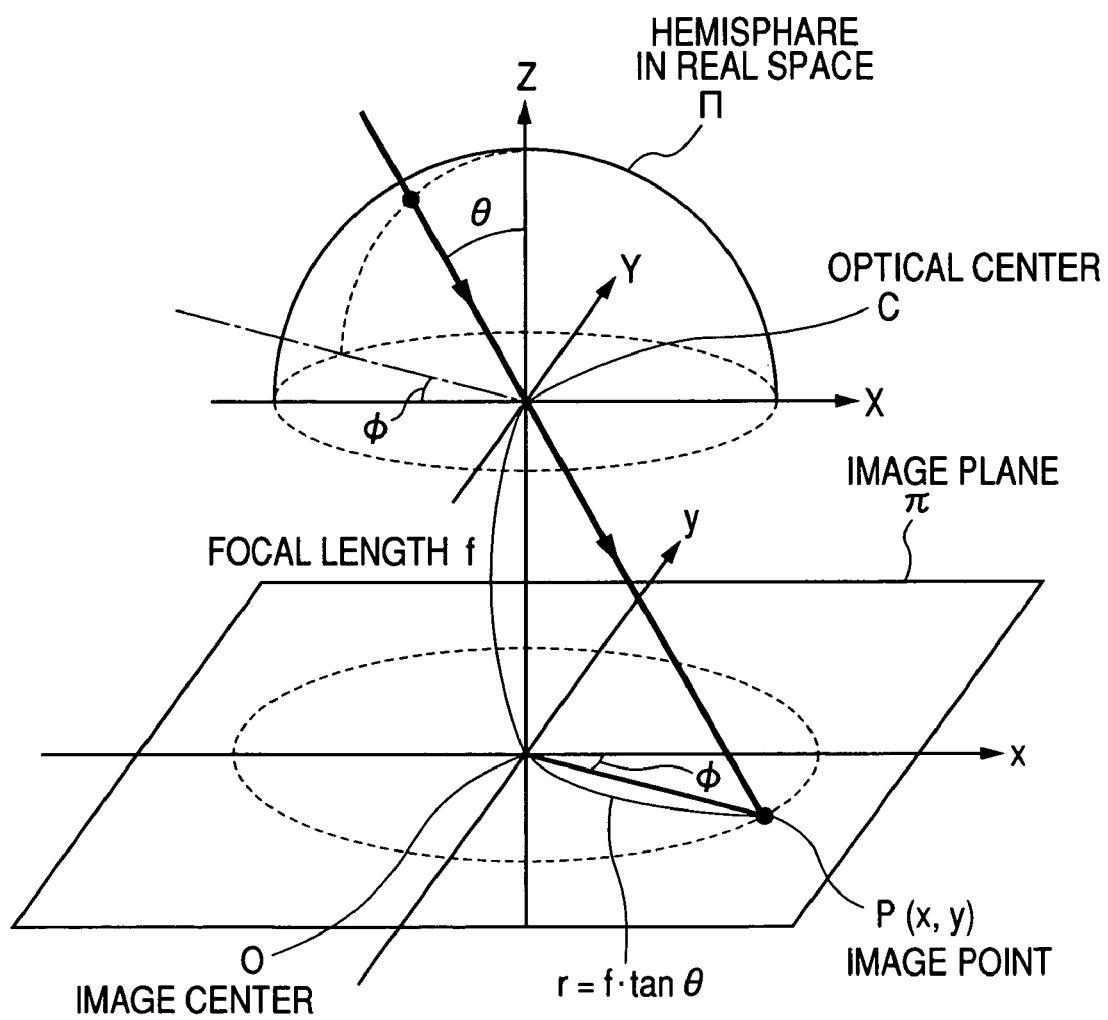
FIG. 12 is a schematic diagram showing a relation between an angle of incidence and an image height in an ordinary lens.

Next, in step S302, the coordinate conversion parameter estimating apparatus corrects the fish-eye distortion of the movement vectors. FIG. 11 schematically shows a relation between an angle of incidence $\theta$ and an image height $r^F$ in a fish-eye optical system of an equidistant projection system. In addition, FIG. 12 schematically shows a relation between an angle of incidence $\theta$ and an image height $r$ in a lens of an ordinary perspective projection system.

When projection of the fish-eye optical system and projection of the ordinary lens are compared, image heights are different at the same angle of incidence. In the fish-eye optical system, a periphery of the image is compressed as the angle of incidence increases.

In this embodiment, the coordinate conversion parameter estimating apparatus applies correction for fish-eye distortion to coordinates $(x^F, y^F)$ of a detection point and coordinates $(x'^F, y'^F)$ after movement, respectively, and calculates a difference between the corrected coordinates (x, y) of the detection point and the corrected coordinates (x', y') after movement to thereby correct movement vectors.

As indicated by Expression (14), the coordinates $(x'^F, y'^F)$ after movement on the fish-eye image is calculated by obtaining a sum of the coordinates $(x^F, y^F)$ on the fish-eye image of the detection point and detected movement vectors $(v_x^F, v_y^F)$ on the fish-eye image.

$$(x'^F, y'^F) = (x^F + v_x^F, y^F + v_y^F) \tag{14}$$

When it is assumed that a projection type of the fish-eye optical system used for photographing is an equidistant projection type (image height $r^F = f^F \cdot \theta$), a distance from an image center on the fish-eye image and an angle of incidence $\theta$ of a ray on an image pickup system have the following relation, $$\theta = \frac{\sqrt{x^{F2} + y^{F2}}}{f^F}, \tag{15}$$

where $f^F$ expresses a focal length of the fish-eye image. A distance on a perspective projection image ($r = f \cdot \tan \theta$) is calculated using this angle of incidence $\theta$ as indicated by the following expression, $$\sqrt{x^2 + y^2} = f \cdot \tan\left(\frac{\sqrt{x^{F2} + y^{F2}}}{f^F}\right), \tag{16}$$

where f expresses a focal length of the perspective projection image. When it is assumed that an angle, which is formed by a line connecting the detection point on the fish-eye image and the image center and an x-axis, is $\phi$, coordinates on the fish-eye image and coordinates on the perspective projection image are associated by the following relational expressions.

$$x = f \cdot \tan\left(\frac{\sqrt{x^{F2} + y^{F2}}}{f^F}\right) \cdot \cos\phi \tag{17}$$

$$y = f \cdot \tan\left(\frac{\sqrt{x^{F2} + y^{F2}}}{f^F}\right) \cdot \sin\phi$$

By correcting the coordinates of the detection point and the point after moved, then taking the difference therebetween, it is possible to correct the movement vectors on the fish-eye image to movement vectors $(v_x, v_y)$ on the perspective projection image.

$$(v_x, v_y) = (x' - x, y' - y) \tag{18}$$

In step S302, the coordinate conversion parameter estimating apparatus applies the correction processing described above to the movement vectors on the fish-eye image detected in step S301. This processing is performed by the movement vector fish-eye correcting portion 302 shown in FIG. 9.

In step S303, the coordinate conversion parameter estimating apparatus judges whether the detection of movement vectors is completed for all designated movement detection points.

In step S304, the coordinate conversion parameter estimating apparatus uses movement vectors at two detection points in a point-symmetrical positional relation with respect to the image center among the corrected movement vectors to calculate coordinate conversion parameters according to a local operation. In step S305, the coordinate conversion parameter estimating apparatus judges whether calculation of local coordinate conversion parameters from the movement vectors is completed for all pairs of detection points in a point-symmetrical positional relation. The processing in steps S304 and S305 is performed in the local parameter calculating portion 303.

Next, in step S306, the coordinate conversion parameter estimating apparatus calculates a rule representing coordinate conversion parameter, that is a representative value of plural local coordinate conversion parameters which are selected on the basis of the respective selected rules, from the local coordinate conversion parameters. In other words, in step S306-1, the coordinate conversion parameter estimating apparatus creates a frequency distribution (a frequency distribution based on a magnitude) of a local coordinate conversion parameter selected in accordance with a selected rule and convolutes the Gaussian function with the frequency distribution. In step S306-2, the coordinate conversion parameter estimating apparatus calculates a largest value in the convoluted frequency distribution as a coordinate conversion parameter representing the selected rule (a rule representing coordinate conversion parameter).

The processing in step S306-1 is performed in the frequency distribution creating circuit 304-2. The processing in step S306-2 is performed in the rule representing parameter calculating circuit 304-3.

Next, in step S307, the coordinate conversion parameter estimating apparatus judges whether the rule representing coordinate conversion parameters are calculated for all the selected rules. In step S308, the coordinate conversion parameter estimating apparatus calculates a whole screen representing coordinate conversion parameter representing deformation of the whole screen from the plural rule representing coordinate conversion parameters calculated for the plural selected rules.

That is, in step S308-1, concerning the rule representing coordinate conversion parameters of the respective selected rules, the coordinate conversion parameter estimating apparatus calculates a weighted error between the rule representing coordinate conversion parameters of the respective selected rules and the rule representing coordinate conversion parameters of the other selected rules. In step S308-2, the coordinate conversion parameter estimating apparatus calculates a coordinate conversion parameter having the smallest weighted error as a whole screen representing coordinate conversion parameter. The processing in step S308 is performed in the whole screen representing parameter calculating portion 305.

In this embodiment, the coordinate conversion parameter estimating apparatus applies the correction for fish-eye distortion to the movement vectors detected on the fish-eye image. Thus, it is possible to estimate a coordinate conversion parameter expressing deformation of an entire image caused by a camera shake in a frame image for which the fish-eye distortion is corrected. In addition, according to this embodiment, the same operational effects as the first embodiment are also obtained.

Fourth Embodiment

Figure 13:
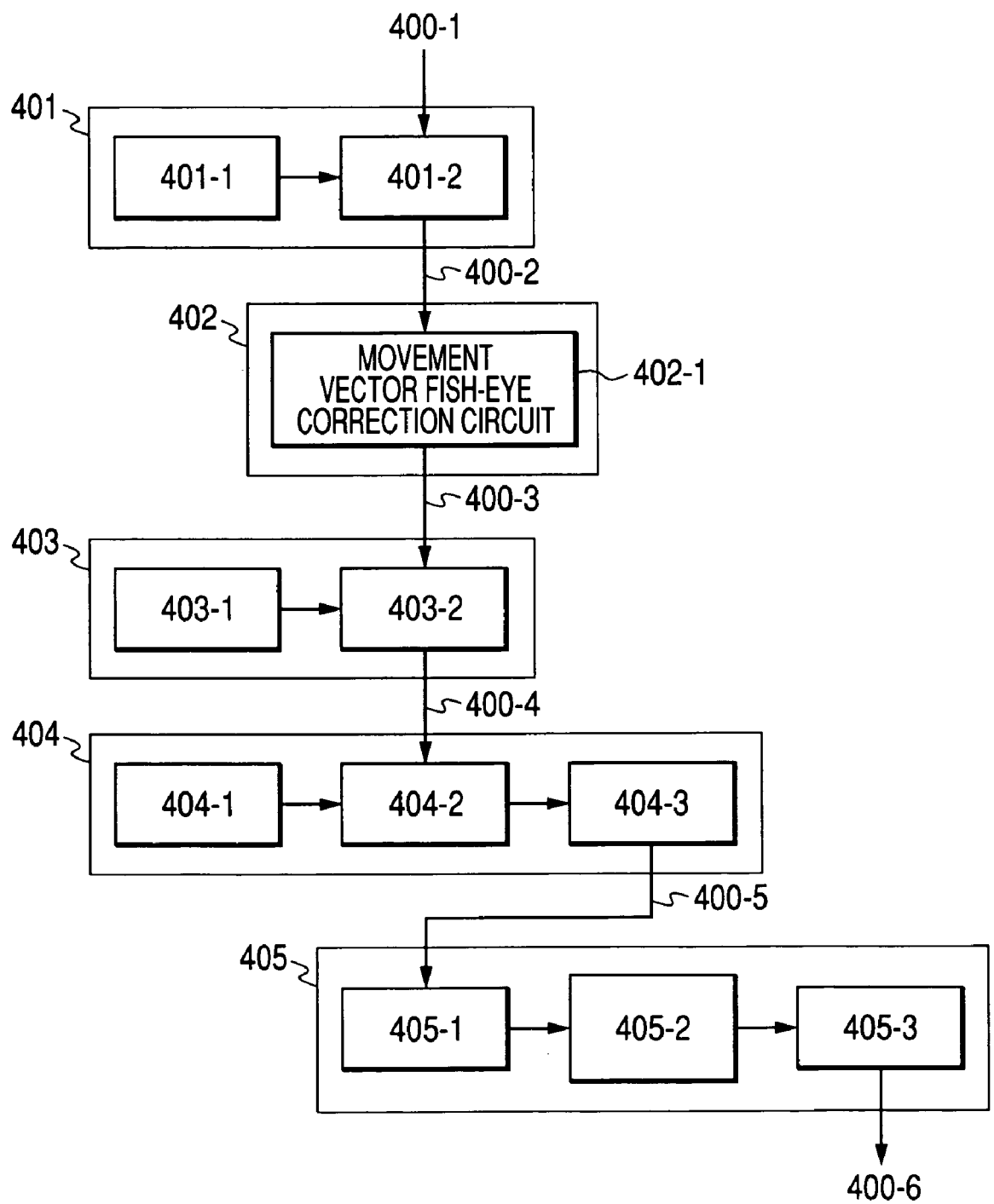
FIG. 13 is a block diagram showing a structure of a coordinate conversion parameter estimating apparatus according to a fourth embodiment of the present invention.

FIG. 13 is a block diagram showing a structure of a coordinate conversion parameter estimating apparatus according to a fourth embodiment of the present invention. Unlike the third embodiment, in this embodiment, the coordinate conversion parameter estimating apparatus applies various kinds of processing to movement vectors to correct fish-eye distortion in a moving image that is photographed using a fish-eye optical system and estimates coordinate conversion parameters expressing image deformation between frame images caused by a camera shake in the corrected image.

Although not shown in the figure, processing sequences of respective components in FIG. 13 are controlled by a controller that controls the entire coordinate conversion parameter estimating apparatus. In the figure, reference numeral 401 denotes a local movement detecting portion. The local movement detecting portion 401 detects movement vectors at detection points designated among frame images of moving image data (fish-eye moving image data) 400-1 that is photographed using a fish-eye optical system. A movement detecting circuit 401-2 detects movement vectors using block matching at detection points on the fish-eye image designated by the movement detection point selecting circuit 401-1. A fish-eye correcting portion 402 applies correction of fish-eye distortion to movement vectors 400-2 detected on the fish-eye image. Note that the local movement detecting portion 401 and the fish-eye correcting portion 402 are the same as the local movement detecting portion 301 and the fish-eye correcting portion 302 in the third embodiment.

A movement component decomposing portion 403 decomposes movement vectors 400-3 subjected to the correction of fish-eye distortion into movement components of magnification and reduction, rotation, horizontal movement, and vertical movement (image deformation components: second information).

A movement vector selecting circuit 403-1 selects movement vectors at two detection points in a point-symmetrical positional relation with respect to the image center. A movement component decomposing circuit 403-2 uses a pair of the movement vectors to decompose the movement vectors into movement components of magnification and reduction, rotation, horizontal movement, and vertical movement.

Reference numeral 404 denotes a movement component calculating portion. In accordance with each of plural selected rules, the movement component calculating portion 404 selects plural movement components of each of identical types or each of the selected rules and calculates a representative movement component (second representative information) as a representative value of movement components for each of the selected rules and each of the types of the movement components. Note that, in this embodiment, as in the first embodiment, the plural selected rules are set as rules for selecting movement components on an identical concentric circle, respectively.

Specifically, the plural movement components are selected in a movement component selecting circuit 404-1 for each of the selected rules and a frequency distribution of the movement component is created by a frequency distribution creating circuit 404-2 on the basis of magnitudes of the selected plural movement components. At this point, as in the first to the third embodiments, the Gaussian function is convoluted with the frequency distribution. A rule representing movement component calculating circuit 404-3 calculates a largest value in the frequency distribution, with which the Gaussian function is convoluted, as a rule representing movement component representing the selected rule and the movement component.

Reference numeral 405 denotes a whole screen representing parameter calculating portion. The whole screen representing parameter calculating portion 405 uses a rule representing movement component 400-5 calculated for the plural selected rules and plural kinds of the movement components to calculate a coordinate conversion parameter representing deformation of a whole screen (a whole screen representing coordinate conversion parameter: third information). Specifically, an inputted rule representing movement component is converted into coordinate conversion parameters representing the selected rules (rule representing coordinate conversion parameters) in a rule representing parameter calculating circuit 405-1. A weighted error calculating circuit 405-2 calculates weighted errors between the respective rule representing coordinate conversion parameters generated for each of the selected rules and the other rule representing coordinate conversion parameters. A whole screen representing parameter calculating circuit 405-3 calculates a rule representing coordinate conversion parameter with the smallest weighted error as a whole screen representing coordinate conversion parameter 400-6 representing the whole screen.

Figure 14:
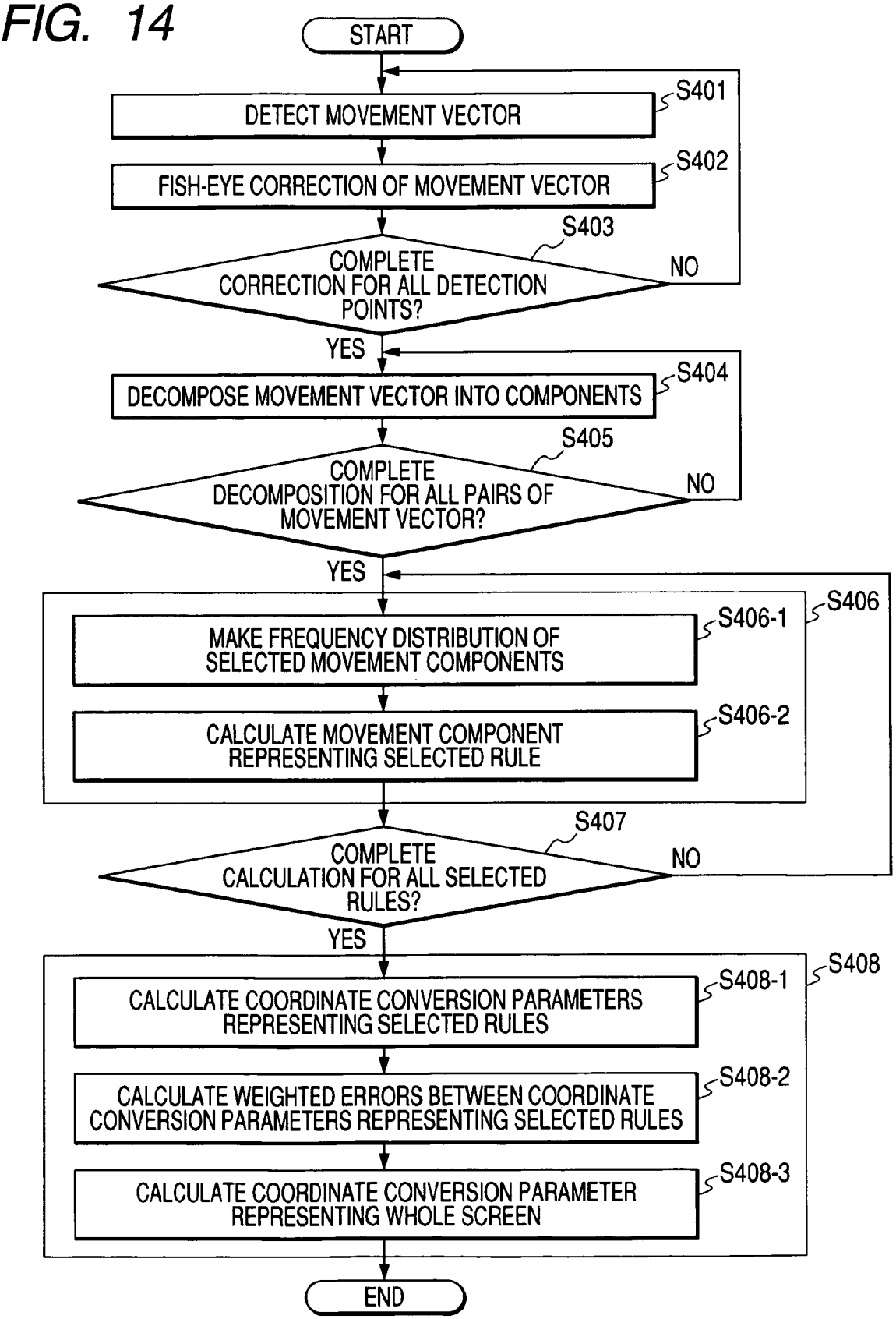
FIG. 14 is a flowchart showing a processing procedure of a coordinate conversion parameter estimating method according to the fourth embodiment of the present invention.

Next, a processing procedure in this embodiment will be explained in detail with reference to a flowchart in FIG. 14. Since step S404 and the subsequent steps are the same as the counterparts in the second embodiment, explanations of the steps are omitted.

First, in step S401, the coordinate conversion parameter estimating apparatus detects movement vectors. Plural detection points are arranged on plural concentric circles, respectively, as in the first embodiment. This processing is performed in the local movement detecting portion 401.

In step S402, the coordinate conversion parameter estimating apparatus corrects fish-eye distortion of the movement vector. This correction processing is performed in the fish-eye correction portion 402 in the same manner as explained in the third embodiment.

In step S403, the coordinate conversion parameter estimating apparatus judges whether the movement vector detection is completed for all the designated detection points. In step S404, the coordinate conversion parameter estimating apparatus uses a pair of the movement vectors, for which fish-eye distortion is corrected, corresponding to two detection points in a point-symmetrical positional relation with respect to the image center to decompose the movement vectors into movement components of magnification and reduction, rotation, vertical movement, and horizontal movement components. This processing is performed in the movement component decomposing portion 403.

In step S405, the coordinate conversion parameter estimating apparatus judges whether the processing in step S404 is completed for all the detection points in a point-symmetrical positional relation.

Next, in step S406, the coordinate conversion parameter estimating apparatus selects plural movement components of each of identical types in accordance with the respective selected rules out of the plural movement components decomposed at all the detection points in a point-symmetrical positional relation and calculates rule representing movement components, which are representative values of the selected rules and types of the movement components, for each of the selected rules and each of the types of the movement components. Specifically, in step S406-1, the coordinate conversion parameter estimating apparatus creates a frequency distribution of the plural respective movement components selected for each of the selected rules, and convolutes the Gaussian function with the frequency distribution. Then, in step S406-2, the coordinate conversion parameter estimating apparatus calculates a largest value in the frequency distribution, with which the Gaussian function is convoluted, as a rule representing movement component value. The processing in step S406-1 is performed in the frequency distribution creating circuit 404-2 and the processing in step S406-2 is performed in the rule representing movement component calculating circuit 404-3.

Next, in step S407, the coordinate conversion parameter estimating apparatus judges whether the processing in the steps S406-1 and S406-2 is completed for all the selected rules.

In step S408, the coordinate conversion parameter estimating apparatus calculates a whole screen representing coordinate conversion parameter representing deformation of the whole screen from the rule representing movement components representing the respective selected rules and the respective types of movement components. Specifically, first, in step S408-1, the coordinate conversion parameter estimating apparatus calculates rule representing coordinate conversion parameters from the rule representing movement components as in the second embodiment. Next, in step S408-2, the coordinate conversion parameter estimating apparatus calculates weighted errors between the respective rule representing coordinate conversion parameters and the other rule representing coordinate conversion parameters. Moreover, in step S408-3, the coordinate conversion parameter estimating apparatus calculates a coordinate conversion parameter having the smallest weighted error calculated in step S408-2 as a whole screen representing coordinate conversion parameter. The processing in step S408-1 is performed in the rule representing parameter calculating circuit 405-1, the processing in step S408-2 is performed in the weighted error calculating circuit 405-2, and the processing in step S408-3 is performed in the whole screen representing parameter calculating circuit 405-3.

In this embodiment, as in the third embodiment, correction for fish-eye distortion is applied to the movement vectors detected on the fish-eye image. Thus, it is possible to estimate a coordinate conversion parameter expressing deformation of an entire image caused by a camera shake in a frame image for which the fish-eye distortion is corrected. In addition, according to this embodiment, the same operational effects as the second embodiment are obtained.

Fifth Embodiment

Figure 15:
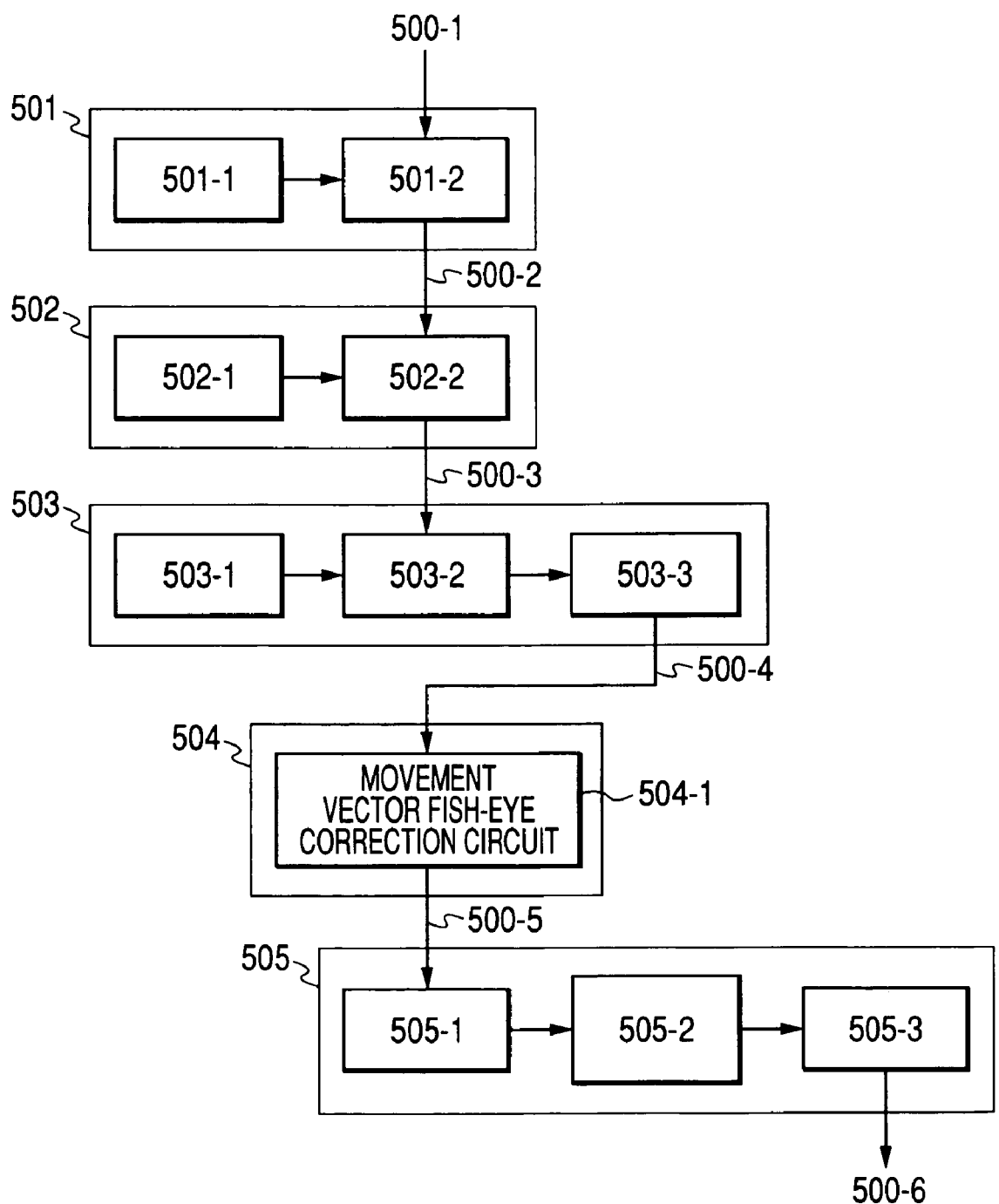
FIG. 15 is a block diagram showing a structure of a coordinate conversion parameter estimating apparatus according to a fifth embodiment of the present invention.

FIG. 15 is a block diagram showing a structure of a coordinate conversion parameter estimating apparatus according to a fifth embodiment of the present invention. In this embodiment, as in the fourth embodiment, the coordinate conversion parameter estimating apparatus applies various kinds of processing to movement vectors to thereby estimate coordinate conversion parameters expressing image deformation between frame images caused by a camera shake in an image for which the fish-eye distortion is corrected. In this embodiment, since correction for fish-eye distortion is applied to rule representing movement components, it is possible to reduce an amount of calculation compared with the fourth embodiment in which correction for fish-eye distortion is applied to the movement vectors.

Although not shown in the figure, processing sequences of respective components in FIG. 15 are controlled by a controller that controls the entire coordinate conversion parameter estimating apparatus.

Reference numeral 501 denotes a local movement detecting portion. The local movement detecting portion 501 detects the movement vectors (first information) between the frame images of moving image data 500-1 that is photographed using a fish-eye optical system. Specifically, a movement detection point selecting circuit 501-1 designates coordinates of detection points at which movement detection is performed. The detection points are arranged on plural concentric circles as in the first embodiment and are arranged such that other detection points are present in positions in a point-symmetrical positional relation with the respective detection points with respect to an image center.

Reference numeral 501-2 denotes a movement detecting circuit. The movement detecting circuit 501-2 performs block matching in coordinates designated by the movement detection point selecting circuit 501-1 between frame images of a moving image that is photographed using the fish-eye optical system and detects the movement vectors. The detected movement vectors are movement vectors on a fish-eye image and have fish-eye distortion.

Here, although correction for fish-eye distortion is applied to the movement vectors in the fourth embodiment, in this embodiment, decomposition of movement vector components is performed without performing correction for fish-eye distortion at this point.

A movement component decomposing portion 502 decomposes movement vectors 500-2 on the fish-eye image into movement components of magnification and reduction, rotation, horizontal movement, and vertical movement (second information). Specifically, movement vectors at two detection points in a point-symmetrical positional relation are selected in a movement vector selecting circuit 502-1. Decomposition into movement components of magnification and reduction, rotation, vertical movement, and horizontal movement components is applied to the movement vectors on the fish-eye image by a movement component decomposing circuit 502-2. It is considered that the movement vectors at detection points at the same distance from the image center have substantially the same amount of fish-eye distortion. Thus, it is possible to decompose movement components without correcting fish-eye distortion using the movement vectors at the two detection points in a point-symmetrical positional relation.

Reference numeral 503 denotes a rule representing movement component calculating portion. The rule representing movement component calculating portion 503 selects plural movement components 500-3 of each of identical types on the fish-eye image in accordance with each of plural selected rules, and calculates a rule representing movement component (second representative information) as a representative value for each of the selected rules and for each of the types of movement components. Specifically, the plural movement components of each of identical types are selected in accordance with the respective selected rules in a movement component selecting circuit 503-1. A frequency distribution based on magnitudes of the selected plural movement components is created in a frequency distribution creating circuit 503-2. In this embodiment, rules for selecting movement components at detection points on an identical concentric circle are set as the respective selected rules. Note that it is considered that the movement vectors on the identical concentric circle have substantially the same fish-eye distortion. Thus, by arranging detection points on concentric circles, it is possible to create frequency distributions for a large number of movement components without correcting the fish-eye distortion.

As in the other embodiments, the Gaussian function is convoluted with the created frequency distribution and an arithmetic operation is performed such that a value having a marginal distribution tends to be a peak.

Specifically, a rule representing movement component calculating circuit 503-3 calculates a largest movement component value in the frequency distribution with which the Gaussian function is convoluted, as a movement component representing the selected rules and the types of movement components (a rule representing movement component).

In this embodiment, the number of concentric circles on which detection points are arranged is equal to the number of selected rules, and representative values of four movement components of magnification and reduction, rotation, vertical movement, and horizontal movement are calculated for the respective selected rules.

Reference numeral 504 denotes a fish-eye correcting portion. The fish-eye correcting portion 504 regards rule representing movement components 500-4 calculated by the rule representing movement component calculating portion 503 as movement components on an x-axis and performs correction for fish-eye distortion.

Reference numeral 505 denotes a whole screen representing parameter calculating portion. The whole screen representing parameter calculating portion 505 calculates a coordinate conversion parameter representing deformation of a whole screen (a whole screen representing coordinate conversion parameter: third information) from rule representing movement components 500-5 for which the fish-eye distortion is corrected. Specifically, a rule representing parameter calculating circuit 505-1 calculates coordinate conversion parameters representing the selected rules (rule representing coordinate conversion parameters) from the respective rule representing movement components for which the fish-eye distortion is corrected. This is performed in the same processing as the second embodiment. Next, a weighted error calculating circuit 505-2 calculates weighted errors between the rule representing coordinate conversion parameters, that is, weighted errors between the respective rule representing coordinate conversion parameters and the other rule representing coordinate conversion parameters. The weighted errors are evaluated by a whole screen representing parameter calculating circuit 505-3. A rule representing coordinate conversion parameter with a smallest error is calculated as a whole screen representing coordinate conversion parameter 500-6 representing deformation of the entire screen. The same processing as the second embodiment is performed in the whole screen representing parameter calculating portion 505.

Figure 16:
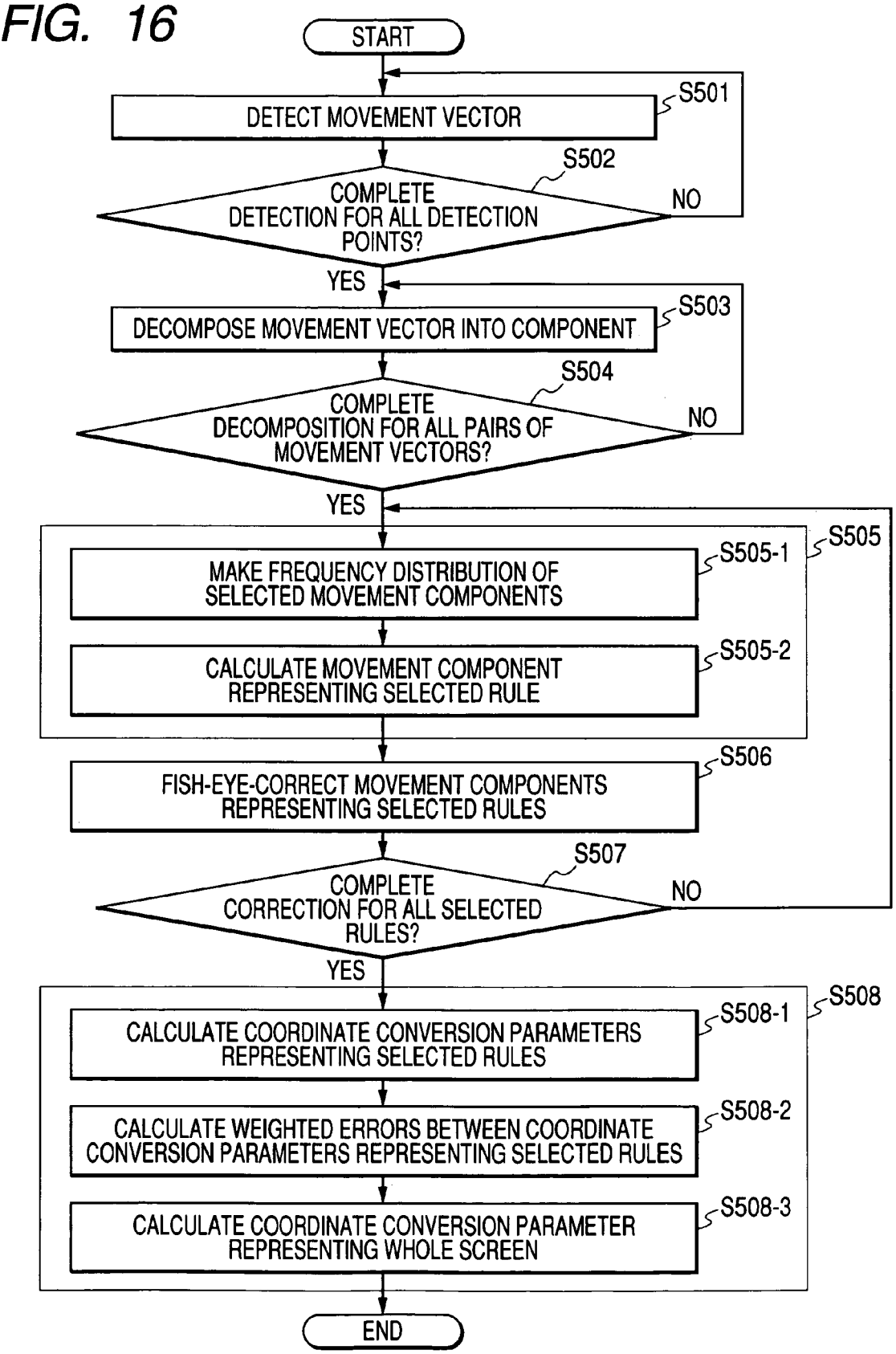
FIG. 16 is a flowchart showing a processing procedure of a coordinate conversion parameter estimating method according to the fifth embodiment of the present invention.

Next, a processing procedure in this embodiment will be explained in detail with reference to a flowchart shown in FIG. 16. First, in step S501, the coordinate conversion parameter estimating apparatus detects movement vectors using block matching at detection points arranged on plural concentric circles. In step S502, the coordinate conversion parameter estimating apparatus judges whether the movement vectors are detected in all the detection points. If the movement vectors are detected in all the detection points, the coordinate conversion parameter estimating apparatus proceeds to the next step S503. If the movement vectors are not detected in all the detection points, the coordinate conversion parameter estimating apparatus repeats the processing in S501. The processing in step S501 is performed in the local movement detecting portion 501. The detected movement vectors are the movement vectors on a fish-eye image and include fish-eye distortion. However, in this embodiment, decomposition of the movement components is performed without performing correction for fish-eye distortion.

In step S503, the coordinate conversion parameter estimating apparatus applies decomposition of movement components of magnification and reduction, rotation, vertical movement, and horizontal movement components to the movement vectors at the detection points on two fish-eye images in a point-symmetrical positional relation with respect to an image center. An amount of fish-eye distortion changes depending on a distance from the image center. In other words, the amount of distortion is the same at detection points at the same distance from the image center. In addition, when it is assumed that the amount of fish-eye distortion does not change extremely near the respective detection points, it is possible to consider that the amount of fish-eye distortion of the movement vectors is substantially the same at detection points at the same distance from the image center except the case in which movement is large. Therefore, an amount of fish-eye distortion is substantially the same between movement vectors at detection points in a point-symmetrical positional relation and it is possible to decompose movement components without correcting the fish-eye distortion. The decomposition of movement components is performed in the same processing as in the second embodiment.

Next, in step S504, the coordinate conversion parameter estimating apparatus judges whether the processing in step S503 is completed for all pairs of movement vectors at two detection points in a point-symmetrical positional relation with respect to the image center. If the processing is completed for all the pairs of movement vectors, the coordinate conversion parameter estimating apparatus proceeds to the next step S505. If the processing is not completed for all the pairs of movement vectors, the coordinate conversion parameter estimating apparatus repeats the processing in step S503. The processing in step S503 is performed in the movement component decomposing portion 502.

In step S505, the coordinate conversion parameter estimating apparatus selects plural movement components in a screen for each of the selected rules and for each type of movement components in accordance with the plural selected rules and calculates rule representing movement components as representative values for the respective selected rules and the respective types of movement components. Specifically, first, in step S505-1, the coordinate conversion parameter estimating apparatus creates a frequency distribution of the respective movement components which are selected in accordance with the respective selected rules on the basis of magnitudes of the components. In this embodiment, the coordinate conversion parameter estimating apparatus selects movement components at detection points on the same concentric circle and creates a frequency distribution of the movement components. Since it is considered that fish-eye distortion of the movement vectors on an identical concentric circle is substantially identical, no problem occurs in creating a frequency distribution concerning magnitudes of the movement components on the identical concentric circle even if correction for fish-eye distortion is not applied to the movement vectors. This is made possible by arranging a large number of detection points on plural concentric circles.

As in the other embodiments, the coordinate conversion parameter estimating apparatus convolutes the Gaussian function with the created frequency distribution. It is considered that movement vectors at detection points on the concentric circles have substantially the same fish-eye distortion. However, when movement is large, a slight difference of fish-eye distortion may occur in the respective movement vectors to cause an error between the movement vectors and an original value. However, it is possible to control an influence of the error by convoluting the Gaussian function with the frequency distribution because, in judging a peak of frequencies, a marginal distribution thereof is reflected on the frequency distribution.

In step S505-2, the coordinate conversion parameter estimating apparatus calculates a value of a movement component largest in the frequency distribution with which the Gaussian function is convoluted, for each of the selected rules and each of the types of movement components as a rule representing movement component representing the selected rule and the type of movement vectors. The processing in step S505-1 is performed in the frequency distribution creating circuit 503-2 and the processing in step S505-2 is performed in the rule representing movement component calculating circuit 503-3.

Next, in step S506, the coordinate conversion parameter estimating apparatus regards rule representing movement components for the respective selected rules as movement components at intersections of concentric circles corresponding to the selected rules and an x-axis to perform correction for fish-eye distortion. The correction for fish-eye distortion is performed by the same processing as the third embodiment.

The correction for fish-eye distortion only has to be applied to four movement components for each of the concentric circles on which the detection points are arranged. Thus, compared with the fourth embodiment in which correction for fish-eye distortion is applied to movement vectors, it is possible to reduce an amount of calculation for the correction for fish-eye distortion. The processing in step S506 is performed in the fish-eye correcting portion 504.

Next, in step S507, the coordinate conversion parameter estimating apparatus judges whether the correction for fish-eye distortion is completed for all the rule representing movement components. If the correction for fish-eye distortion is completed for all the rule representing movement components (YES), process proceeds to the next step S508. If the correction for fish-eye distortion is not completed for all the rule representing movement components (NO), the coordinate conversion parameter estimating apparatus repeats the processing in step S505.

In step S508, the coordinate conversion parameter estimating apparatus uses plural rule representing movement components representing plural selected rules and plural kinds of movement components, respectively, to calculate a whole screen representing coordinate conversion parameter representing deformation of a whole screen. Specifically, first, in step S508-1, the coordinate conversion parameter estimating apparatus calculates coordinate conversion parameters representing the respective selected rules (rule representing coordinate conversion parameters) from the respective rule representing movement components. Next, in step S508-2, the coordinate conversion parameter estimating apparatus calculates weighted errors between the respective rule representing coordinate conversion parameters calculated for the respective selected rules and the other rule representing coordinate conversion parameters. Then, in step S508-3, the coordinate conversion parameter estimating apparatus calculates a coordinate conversion parameter with a minimum error as a whole screen representing coordinate conversion parameter representing deformation of the whole screen. The processing in step S508 is the same as the counterpart in the second embodiment. In addition, this processing is performed in the whole screen representing parameter calculating portion 505.

According to this embodiment, it is possible to estimate a coordinate conversion parameter that expresses deformation of an entire image caused by a camera shake in a frame image for which fish-eye distortion is corrected.

In this embodiment, as described above, a large number of detection points are arranged on concentric circles to make it possible to perform an arithmetic operation among a large number of movement vectors without performing correction for fish-eye distortion by utilizing the fact that an amount of fish-eye distortion depends on a distance from an image center and movement vectors at detection points at the same distance from the image center have substantially the same amount of fish-eye distortion. Consequently, it is possible to calculate a representative value (a rule representing movement component) on concentric circles of movement components, which form movement vectors at detection points on concentric circles, from the movement vectors without performing correction for fish-eye distortion. Thus, it is possible to reduce the number of movement components requiring correction for fish-eye distortion and to reduce an amount of calculation required for the correction.

Even when a difference occurs in amounts of fish-eye distortion in movement vectors, it is possible to take into account not only the largest frequency value but also a marginal distribution by convoluting a single peak function with a frequency distribution. Thus, it is possible to minimize an influence of an error due to the difference in the amount of distortion.

In this embodiment, it is possible to obtain the same operational effects as the second embodiment. It is possible to estimate a coordinate conversion parameter, which is hardly affected by photographing conditions and is optimum for representing an entire image, with simple processing even in a moving image including distortion that is taken using a fish-eye optical system. In addition, it is also possible to detect very very small magnification and reduction and rotation.

Note that, in the respective embodiments described above, the block matching method is used for movement detection. However, movement detection is not limited to this method and other movement detecting methods such as a gradient method may be used.

The present invention can also be applied to the case in which a storage medium, which has stored therein a program code of software for realizing the functions of the embodiments explained above, is supplied to a system or an apparatus, and a computer (or a CPU or an MPU) of the system or the apparatus reads out and executes the program code stored in the storage medium.

In this case, the program code itself read out from the storage medium realizes the functions of the embodiments explained above and the storage medium having stored therein the program code constitutes the present invention.

As the storage medium for supplying the program code, for example, a floppy disk, a hard disk, an optical disk, a magneto-optical disk, a CD-ROM, a CD-R, a magnetic tape, a nonvolatile memory card, a ROM, and the like can be used.

It is needless to mention that the scope of the present invention includes not only the case in which the computer executes the read-out program code to realize the functions of the embodiments explained above but also the case in which an operating system (OS) or the like running on the computer executes actual processing partially or entirely on the basis of an instruction of the program code and the functions of the embodiments explained above are realized by the processing.

Moreover, it is needless to mention that the scope of the present invention includes the case in which the program code read out from the storage medium is written in a memory included in a function expansion board inserted in the computer or a function expansion portion connected to the computer and, then, a CPU or the like included in the function expansion board or the function expansion portion executes actual processing partially or entirely on the basis of an instruction of the program code, and the functions of the embodiments explained above are realized by the processing.

In the explanations of the respective embodiments, movement vectors at respective detection points are detected to calculate coordinate conversion parameters from the movement vectors. However, the present invention can be applied to any apparatus as long as the apparatus detects information indicating movement of respective detection points and obtains information expressing image deformation from the information.

According to the embodiments, it is possible to obtain information expressing image deformation between frame images caused by a camera shake accurately with almost no influence of photographing conditions through simple processing. Moreover, it is possible to detect movement between frame images of a moving image with distortion such as a fish-eye image easily and accurately.

This application claims priority from Japanese Patent Application No. 2004-081151 filed on Mar. 19, 2004, which is hereby incorporated by reference herein.

What is claimed is:

1. An image deformation estimating method comprising:
   a first step of providing plural local areas in plural frame images, which form a moving image, and obtaining plural pieces of first information indicating movements among the plural frame images in the plural local areas, respectively;
   a second step of obtaining plural pieces of second information, which express image deformation of each of the plural local areas, using the plural pieces of first information;
   a third step of preparing plural selected rules, selecting the plural pieces of second information for each of the selected rules, and obtaining second representative information which represents the selected plural pieces of second information, for each of the selected rules; and
   a fourth step of obtaining third information expressing deformation of an entire image by use of the plural pieces of second representative information which are obtained for the plural selected rules,
   wherein the third step comprises obtaining a frequency distribution of the second information corresponding to a magnitude of the second information for each of the selected rules to obtain the third information on the basis of the frequency distribution.

2. An image deformation estimating method according to claim 1, wherein the third step comprises convoluting a function having a single peak with the frequency distribution to set a largest piece of the second information obtained by the convolution as the second representative information.

3. An image deformation estimating program for causing a computer to execute the image deformation estimating method according to claim 1.

4. An image deformation estimating method comprising:
   a first step of providing plural local areas in plural frame images, which form a moving image, and obtaining plural pieces of first information indicating movements among the plural frame images in the plural local areas, respectively;
   a second step of obtaining plural pieces of second information, which express image deformation of each of the plural local areas, using the plural pieces of first information;
   a third step of preparing plural selected rules, selecting the plural pieces of second information for each of the selected rules, and obtaining second representative information which represents the selected plural pieces of second information, for each of the selected rules; and
   a fourth step of obtaining third information expressing deformation of an entire image by use of the plural pieces of second representative information which are obtained for the plural selected rules,
   wherein the fourth step comprises obtaining the third information so as to minimize a weighted error calculated based on at least one of a number of the local areas, which are used for obtaining the respective pieces of the second representative information among the plural pieces of second representative information, and a distance from a reference position in the image.

5. An image deformation estimating method comprising:
   a first step of providing plural local areas in plural frame images, which form a moving image, and obtaining plural pieces of first information indicating movements among the plural frame images in the plural local areas, respectively;
   a second step of obtaining plural pieces of second information, which express image deformation of each of the plural local areas, using the plural pieces of first information;
   a third step of preparing plural selected rules, selecting the plural pieces of second information for each of the selected rules, and obtaining second representative information which represents the selected plural pieces of second information, for each of the selected rules; and
   a fourth step of obtaining third information expressing deformation of an entire image by use of the plural pieces of second representative information which are obtained for the plural selected rules,
   wherein the first step comprises providing the plural local areas in accordance with a predetermined arrangement condition; and the respective selected rules are rules for selecting the second information corresponding to the local areas provided in accordance with the same arrangement condition.

6. An image deformation estimating method comprising:
   a first step of providing plural local areas in plural frame images, which form a moving image, and obtaining plural pieces of first information indicating movements among the plural frame images in the plural local areas, respectively;
   a second step of obtaining plural pieces of second information, which express image deformation of each of the plural local areas, using the plural pieces of first information;
   a third step of preparing plural selected rules, selecting the plural pieces of second information for each of the selected rules, and obtaining second representative information which represents the selected plural pieces of second information, for each of the selected rules; and
   a fourth step of obtaining third information expressing deformation of an entire image by use of the plural pieces of second representative information which are obtained for the plural selected rules,
   wherein the frame images comprise fish-eye images;
   wherein the image deformation estimating method further comprises a fifth step of applying correction processing for fish-eye deformation components to the first information; and
   wherein the second step comprises obtaining the second information using the first information subjected to the correction processing.

7. An image deformation estimating method comprising:
   a first step of providing plural local area in plural frame images, which form a moving image, and obtaining plural pieces of first information indicating movements among the plural frame images in the plural local areas, respectively;
   a second step of decomposing the respective pieces of first information into plural pieces of second information expressing plural image deformation components, different from each other, of each of the plural local areas;

a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and a fourth step of obtaining third information expressing deformation of an entire image by use of the plural pieces of second representative information obtained for the plural image deformation components and the plural selected rules, wherein the third step comprises obtaining a frequency distribution of the second information corresponding to a magnitude of the second information for each of the image deformation components and for each of the selected rules to obtain the second representative information on the basis of the frequency distribution.

8. An image deformation estimating method according to claim 7, wherein the third step comprises convoluting a function having a single peak with the frequency distribution to set a largest piece of the second information obtained by the convolution as the second representative information.

9. An image deformation estimating program for causing a computer to execute the image deformation estimating method according to claim 7.

10. An image deformation estimating method comprising:
a first step of providing plural local area in plural frame images, which form a moving image, and obtaining plural pieces of first information indicating movements among the plural frame images in the plural local areas, respectively;
a second step of decomposing the respective pieces of first information into plural pieces of second information expressing plural image deformation components, different from each other, of each of the plural local areas;
a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and
a fourth step of obtaining third information expressing deformation of an entire image by use of the plural pieces of second representative information obtained for the plural image deformation components and the plural selected rules,
wherein the fourth step comprises obtaining the third information so as to minimize a weighted error calculated based on at least one of a number of the local areas, which are used for obtaining the respective pieces of the second representative information among the plural pieces of second representative information, and a distance from a reference position in the image.

11. An image deformation estimating method comprising:
a first step of providing plural local area in plural frame images, which form a moving image, and obtaining plural pieces of first information indicating movements among the plural frame images in the plural local areas, respectively;
a second step of decomposing the respective pieces of first information into plural pieces of second information expressing plural image deformation components, different from each other, of each of the plural local areas;
a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and
a fourth step of obtaining third information expressing deformation of an entire image by use of the plural pieces of second representative information obtained for the plural image deformation components and the plural selected rules,
wherein the first step comprises providing the plural local areas in accordance with a predetermined arrangement condition; and the respective selected rules are rules for selecting the second information corresponding to the local areas provided in accordance with the same arrangement condition.

12. An image deformation estimating method comprising:
a first step of providing plural local area in plural frame images, which form a moving image, and obtaining plural pieces of first information indicating movements among the plural frame images in the plural local areas, respectively;
a second step of decomposing the respective pieces of first information into plural pieces of second information expressing plural image deformation components, different from each other, of each of the plural local areas;
a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and
a fourth step of obtaining third information expressing deformation of an entire image by use of the plural pieces of second representative information obtained for the plural image deformation components and the plural selected rules,
wherein the frame images comprises fish-eye images,
wherein the image deformation estimating method further comprises a fifth step of applying correction processing for fish-eye deformation components to the first information; and
wherein the second step comprises decomposing the respective pieces of first information subjected to the correction processing into the plural pieces of second information.

13. An image deformation estimating method comprising:
a first step of providing plural local area in plural frame images, which form a moving image, and obtaining plural pieces of first information indicating movements among the plural frame images in the plural local areas, respectively;
a second step of decomposing the respective pieces of first information into plural pieces of second information expressing plural image deformation components, different from each other, of each of the plural local areas;
a third step of preparing plural selected rules, selecting plural pieces of the second information for each of the image deformation components and for each of the selected rules, and obtaining second representative information, which represents the selected plural pieces of second information, for each of the image deformation components and for each of the selected rules; and a fourth step of obtaining third information expressing deformation of an entire image by use of the plural pieces of second representative information obtained for the plural image deformation components and the plural selected rules, wherein the frame images comprise fish-eye images, wherein the image deformation estimating method further comprises a fifth step of applying correction processing for fish-eye deformation components to the first information; and wherein the third step comprises obtaining the second representative information using the second information subjected to the correction processing.

* * * * *